United States Patent
Kuroda et al.

(10) Patent No.: US 6,371,889 B1
(45) Date of Patent: Apr. 16, 2002

(54) ENGINE AUTOMATIC START STOP CONTROL APPARATUS

(75) Inventors: Shigetaka Kuroda; Atsushi Matsubara; Shinichi Kitajima; Kazutomo Sawamura; Atsushi Izumiura; Takashi Iwamoto, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 44 days.

(21) Appl. No.: 09/637,252

(22) Filed: Aug. 14, 2000

(30) Foreign Application Priority Data

Aug. 16, 1999 (JP) ............................................. 11-230131

(51) Int. Cl.⁷ ............................................. B60K 41/02
(52) U.S. Cl. ...................... 477/181; 477/167; 477/174
(58) Field of Search .............................. 477/167, 174, 477/181, 90, 107, 109, 110

(56) References Cited

U.S. PATENT DOCUMENTS 4,402,286 A * 9/1983 Pagel et al. ............... 123/179.3
4,466,392 A * 8/1984 Uchida et al. ............ 123/179.4
4,500,794 A * 2/1985 Hamano et al. ....... 123/179.3 X
5,653,659 A * 8/1997 Kunibe et al. .......... 477/110 X
6,190,284 B1 * 2/2001 Kuroda et al. .............. 477/107

FOREIGN PATENT DOCUMENTS

DE          3320401    * 12/1983
DE          4421512    *  6/1995

* cited by examiner

Primary Examiner—Charles A Marmor
Assistant Examiner—Ha Ho
(74) Attorney, Agent, or Firm—Armstrong, Westerman & Hattori, LLP

(57) ABSTRACT

The engine automatic start stop control apparatus that controls an engine to be automatically stopped or started in response to driving conditions of a vehicle, comprises: a clutch detector for detecting depression of a clutch pedal; an accelerator detector for detecting depression of an accelerator pedal; an automatic stop detector for detecting an automatic stop of the engine; a stop history checker for checking a history of stopping of the vehicle when the automatic stop detector detects the stop of the vehicle; and an automatic start device for terminating the automatic stop of the engine and starting the engine when the automatic stop detector detects the automatic stop, when the clutch detector detects the depression of the clutch pedal, when the stop history checker finds no stop history, and when the accelerator detector detects depression of the accelerator pedal.

2 Claims, 14 Drawing Sheets

ENGINE AUTOMATIC START STOP CONTROL APPARATUS

BACKGROUND OF THE INVENTION

1. Field of the Invention

This invention relates to an engine automatic start stop control apparatus that automatically stops an idling engine in accordance with prescribed conditions.

This application is based on Japanese Patent Application No.11-230131, the contents of which are incorporated herein by reference.

2. Description of the Related Art

Recently, environmental problems such as global warming have become the focus of attention, and electric cars and hybrid vehicles have been actively developed so as to reduce the discharge of carbon dioxide and the like. Electric cars have no exhaust gas discharge; thus, they are most preferable in consideration of the environmental problems. However, the cruising range per single charge is short; thus, it is necessary to examine the practical possibility of vehicles employing an engine.

Hybrid vehicles comprise an engine and an (electric) motor, wherein the battery is charged using the rotation of the engine. When the discharge of carbon dioxide or the like is relatively large and the engine (rotation) speed is low, it is possible to drive the vehicle by only using the motor or by using both the engine and motor, thereby decreasing the discharge of carbon dioxide. Recently, hybrid vehicles have found practical use because the discharge of the carbon dioxide can be reduced and long distance driving is possible while the characteristics specific to conventional vehicles (i.e., cruising range, operability, and the like) can be maintained.

A technique for automatically stopping the engine has recently become the focus of attention, where the objective of this technique is to reduce the discharge of carbon dioxide and $NO_x$ by automatically stopping the engine during idling and by subsequently automatically starting the engine.

For example, when using a gear other than the first gear, when a clutch pedal is depressed, and when the vehicle speed is below a predetermined speed, it can be determined that the driver would like to stop the vehicle, and then the engine is automatically stopped. However, in this situation, the driver may not intend to stop the vehicle. In this case, when the driver releases the clutch pedal to accelerate the vehicle and depresses the accelerator pedal, the vehicle cannot accelerates as the driver wants to, and the drivability may be degraded.

BRIEF SUMMARY OF THE INVENTION

It is therefore an object of the present invention to provide an engine automatic start stop control apparatus which can control the engine and which controls the idling operation to reduce exhaust gas while maintaining the drivability.

The engine automatic start stop control apparatus of the present invention that controls an engine to automatically stop or start in response to the driving conditions of a vehicle, comprises: a clutch detector (SB18) for detecting depression of a clutch pedal; an accelerator detector (SB26) for detecting depression of an accelerator pedal; an automatic stop detector (18, SB10) for detecting an automatic stop of the engine; a stop history checker (18, SB24) for checking the history of the stops of the vehicle when the automatic stop detector detects the stop of the vehicle; and an automatic start device (18, SB10, SB18, SB24, SB26) for terminating the automatic stop of the engine and starting the engine when the automatic stop detector detects the automatic stop, when the clutch detector detects the depression of the clutch pedal, when the stop history checker does not find a history of stops, and when the accelerator detector detects depression of the accelerator pedal.

According to the present invention, when the automatic stop detector detects the automatic stop, when the clutch detector detects the depression of the clutch pedal, and when the stop history checker finds no stop history, that is, when the driver allows the vehicle to travel by inertia, the automatic stop state terminates, and the engine is restarted. Therefore, when the driver releases the clutch pedal, the driving force is provided, and thus the drivability can be improved.

Further, the automatic stop detector detects a fuel supply cut when the vehicle decelerates, to detect the automatic stop of the engine.

Because the automatic stop of the engine is detected based on the fuel supply cut when the vehicle decelerates, the drivability can be improved also in a vehicle which does not supply the fuel when the engine is stopped.

BRIEF DESCRIPTION OF THE DRAWINGS

These and other objects, aspects and embodiments of e present invention will be described in more detail with reference to the following figures, of which.

DETAILED DESCRIPTION OF THE INVENTION

This invention will be described in detail by way of examples with reference to the accompanying drawings.

Figure 1:
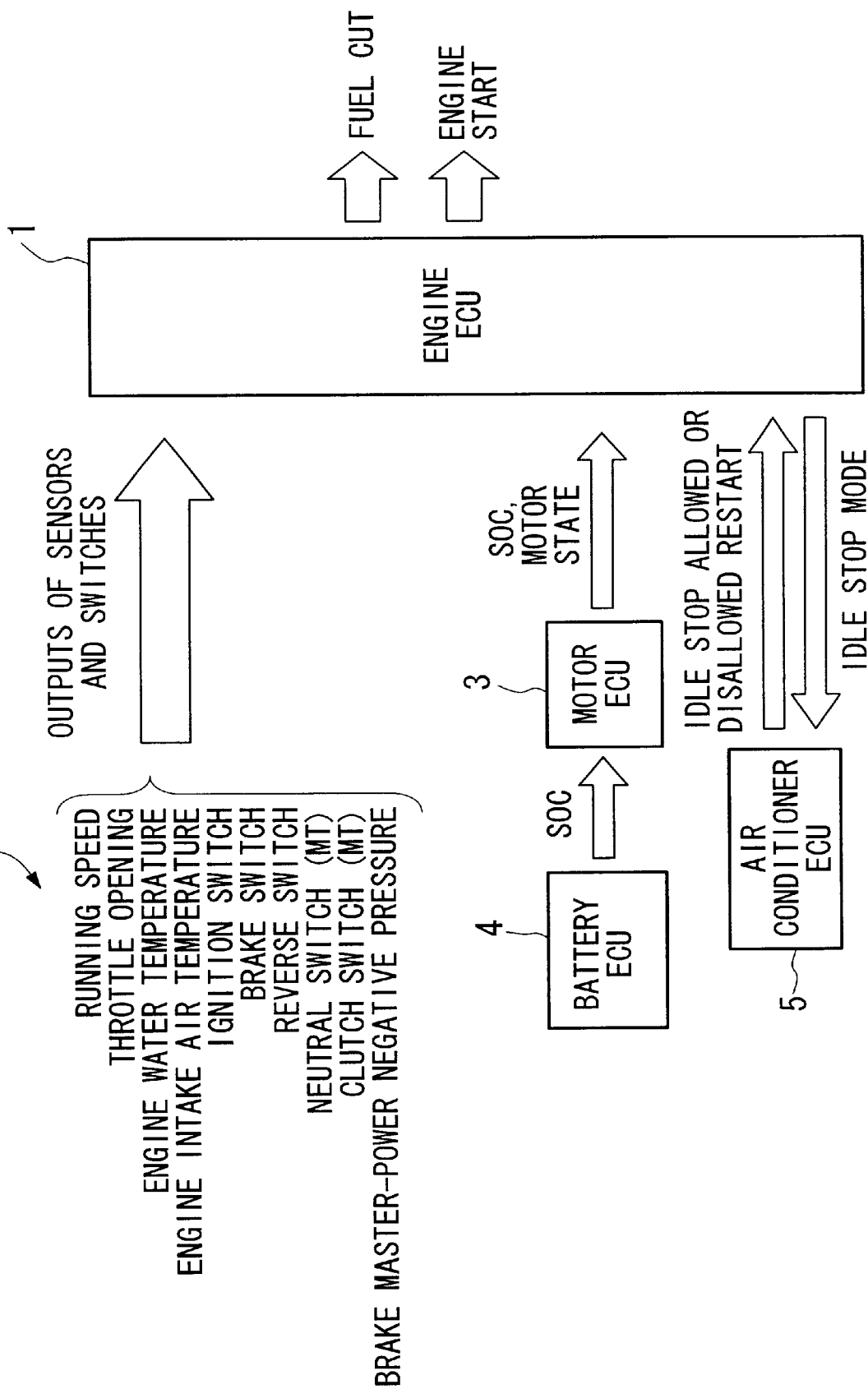
FIG. 1 is a block diagram showing an outline of the configuration of an engine automatic start stop control apparatus in accordance with the invention.

FIG. 1 shows an outline of the configuration of an engine automatic start stop control apparatus in accordance with this invention. The engine automatic start stop control apparatus is implemented by an engine ECU 1, which controls fuel supply to the engine (not shown) to start or stop. Basically, the engine ECU 1 performs prescribed engine controls based on the outputs of sensors and switches, which are designated by the reference symbol P1 in FIG. 1.

As the outputs of the sensors and switches, the reference symbol P1 designates the running speed of a vehicle, the degree of depression of the accelerator pedal, the engine water temperature, the engine intake air temperature, the ON/OFF state of an ignition switch, ON/OFF of a brake, a shift position, the ON/OFF state of the clutch (which is used in case of a manual transmission (MT) vehicle) and master power negative pressure of a brake equipped with a servo device.

The present specification uses the term of "idle stop" to represent an event in which an idling engine is stopped, and the fuel supply is cut according to various conditions, which will be described below, when the vehicle decelerates.

In the case of a hybrid vehicle equipped with a motor in addition to an engine, there are provided a battery ECU 4 and a motor ECU 3. Herein, the battery ECU 4 is used to control the state (e.g., remaining battery charge (or state of charge) and temperature) of a battery which is a power source for the motor, while the motor ECU 3 is used to control the state (e.g., rotating speed) of the motor. Specifically, the battery ECU 4 outputs the "SOC" (or "State of Charge") representing the remaining battery charge of the battery, while the motor ECU 3 outputs a motor state signal representing the present state of the motor as to whether the motor can be started, for example. Thus, the engine ECU 1 performs prescribed engine controls based on the SOC output from the battery ECU 4 and the motor state signal output from the motor ECU 3. The engine ECU 1 operates based on the aforementioned factors to respond to special conditions of the hybrid vehicle, as follows:

Even if the engine is automatically stopped by an idle stop operation, the battery supplies electric power to several components (e.g., ECUs, head lights, winkers (or turn signals)). So, if those components consume too much electric power, the engine cannot be restarted or the motor cannot be driven after restarting the engine, due to a reduction of the electric charge of the battery.

The vehicles (or automobiles) available on the market are often equipped with air conditioners, the compressors of which are driven by the engines. Therefore, the cars equipped with automatic idle stop controls cannot drive the air conditioners when the engine idling is stopped. By merely performing engine controls based on the states of the vehicles such as the running speed and engine speed, it is impossible to provide drivers with comfortable driving conditions in response to variations of the outside air temperature, which can become higher or lower than a comfortable range of temperature for drivers. For this reason, the engine automatic start stop control apparatus of FIG. 1 is equipped with an air conditioner ECU 5 for controlling the state of the air conditioner. Hence, the engine ECU 1 performs prescribed engine controls based on the operating conditions of the air conditioner which are set by the driver.

Now, an engine automatic start stop control apparatus will be described in further detail in accordance with an embodiment of the invention.

Figure 2:
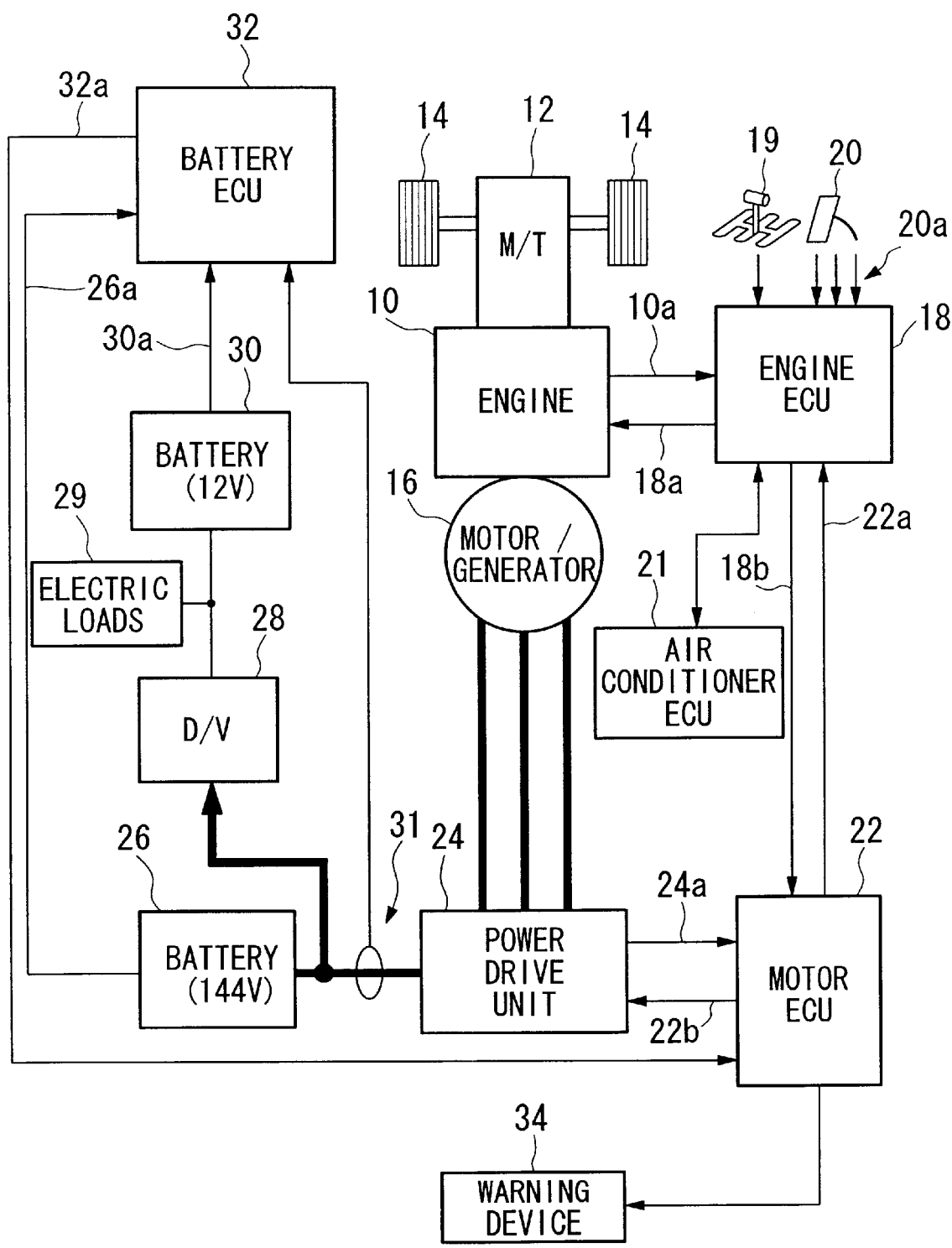
FIG. 2 is a block diagram showing a concrete configuration of the engine automatic start stop control apparatus in accordance with the first embodiment of the invention.

FIG. 2 shows a configuration of the engine automatic start stop control apparatus of the first embodiment. The first embodiment is designed for a hybrid vehicle equipped with a manual transmission (MT).

In FIG. 2, an engine 10 produces driving power, which is transmitted to wheels 14 by means of a manual transmission 12. Each of the wheels (or some of the wheels) 14 is equipped with a pulse generator (not shown) which generates a pulse for every rotation. An engine ECU 18 calculates the running speed of the vehicle based on intervals of time measured between the pulses generated by the wheels 14. In addition, the apparatus installs a motor/generator 16, which operates with a three phase AC power supply, in parallel with the engine 10. A rotation shaft of the motor/generator 16 is directly connected with a rotation shaft of the engine 10. When the engine 10 is stopped, the motor/generator 16 plays the role of a motor to produce driving power, which is transmitted to the wheels 14 by means of the manual transmission 12. When the engine 10 is running, the rotation shaft of the motor/generator 16 is rotated by the engine 10 so that the motor/generator 16 plays the role of a generator for generating electric power.

Through the signal line 10a, an engine ECU 18 receives as inputs from the engine 10 various signals, which represent the engine speed Ne, air intake passage pressure Pb, water temperature TW and intake air temperature, for example. In addition, the engine ECU 18 also receives pedal depression signals indicating whether a driver is depressing pedals 20 by way of signal lines 20a. In response to those signals, the engine ECU 18 produces control signals for controlling the fuel supply and ignition timing, which are supplied to the engine 10 by way of a signal line 18a. A temperature sensor for measuring the intake air temperature of the engine 10 is arranged inside of an air intake passage, which is provided between an air cleaner (not shown) and the engine 10, for example. The aforementioned pedals 20 correspond to the accelerator pedal, the clutch pedal and the brake pedal. In the case of the accelerator pedal, the engine ECU 18 receives a depression signal and a depression angle signal ($\theta_{Th}$) representing a depression angle of the accelerator pedal. Further, the engine ECU 18 receives a gear select signal, representing a gear that the driver selects by operating shift lever 19. Furthermore, the engine ECU 18 receives from an air conditioner ECU 21 a signal indicating whether an idle stop control of the engine is allowed in response to its setting made by the driver.

The engine ECU 18 is connected with the motor ECU 22 by way of signal lines 18b, 22a. By way of the signal line 18b, the engine ECU 18 outputs to the motor ECU 22 control signals which initiate the operation of motor/generator 16 and which designate its output power. By way of the signal line 22a, the motor ECU 22 outputs to the engine ECU 18 signals which represent the remaining battery charge and the amount of output current of the battery 26, the details of which will be described later.

A power drive unit 24 is connected with the motor/generator 16 and is also connected with the motor ECU 22 by way of a signal line 22b. In response to control signals given from the motor ECU 22, the power drive unit 24 converts a DC power supply from the battery 26 to three phase AC power having prescribed magnitudes in electricity, which is supplied to the motor/generator 16. The power drive unit 24 detects phase currents and full currents that flow through the motor/generator 16. Detected phase currents and full currents are supplied to the motor ECU 22 by way of the signal line 24a. In consideration of the detected phase currents and full currents given from the power drive unit 24, the motor ECU 22 performs (arithmetic) operations to designate an amount of electric power to be supplied to the motor/generator 16 in such a way that the motor/generator 16 actually produces the output power designated by the foregoing control signal which is sent from the engine ECU 18 by way of the signal line 18b.

A current detector 31 is installed and arranged between the battery 26 and the power drive unit 24. The current detector 31 detects the output current of the battery 26. The amount of detected current is supplied to the battery ECU 32. The battery 26 is equipped with a voltage detector and a temperature detector, neither of which is shown in FIG. 2. The detected values of the voltage and temperature of the battery 26 are sent to the battery ECU 32 via the signal line 26a.

A downverter 28 is connected between the power drive unit 24 and the battery 26. The downverter 28 converts the output DC voltage of the power drive unit 24 or battery 26 to a prescribed voltage, which is 12 V, for example. The downverter 28 is connected to a battery 30 whose output voltage is 12 V and the electric loads 29. The electric loads 29 include loads due to wipers and headlights as well as loads due to control devices such as the engine ECU 18, motor ECU 22 and battery ECU 32. The battery 30 is equipped with a voltage detector and a current detector, neither of which is shown in FIG. 2. The detected values of the voltage and current of the battery 30 are sent to the battery ECU 32 by way of a signal line 30a.

The battery ECU 32 normally monitors the states of the batteries 26, 30 such as the remaining battery charge, temperature and current, for example. Specifically, the battery ECU 32 detects remaining battery charge and output currents of the battery 26 as well as the output current of the battery 30, and the detection results are sent to the motor ECU 22 by way of a signal line 32a.

A warning device 34 indicates the driver of the condition of the engine 10, i.e., whether the engine (idling) is stopped or not. The warning device 34 is arranged at a prescribed location on the display panel of the vehicle close to a driver's seat, for example. Under the idle stop conditions w wherein the engine idling is controlled so as to stop when the vehicle is stopped, the warning device 34 turns on and off a light (or lights) if the driver releases the clutch pedal, in other words, if the clutch pedal is released to establish a fully closed state of the clutch. Restarting of the engine 10 is carried out in accordance with driver's intention. In addition, the engine 10 is also automatically restarted in response to a reduction of the remaining battery charge of the battery 26, for example. In this case, the engine 10 is not restarted unless the driver deeply depresses the clutch pedal. Therefore, the driver is informed of the restarting request of the engine 10 by depression of the clutch pedal. When a door of the vehicle is opened in an idle stop mode, the warning device 34 informs the driver that the engine idling is stopped by an alarm sound or by turning on a light (or lights) used for indication of the idle stop mode.

Next, overall operations of the vehicle will be described in connection with the engine automatic start stop control apparatus, which is configured in accordance with the embodiment of the invention, Firstly, a description will be given for an engine running mode in which the vehicle is driven by the power of the engine 10.

When the driver depresses the pedal 20, signals corresponding to which of the pedals is being depressed are forwarded to the engine ECU 18 by way of the signal line 20a. In response to the signals, the engine ECU 18 outputs control signals to the engine 10 by way of the signal line 18a. That is, the engine ECU 18 controls fuel supply and ignition timing to control the operation of the engine 10.

The engine 10 outputs signals indicating the engine speed, air intake passage pressure and water temperature to the engine ECU 18 by way of the signal line 10a. Based on those signals, the engine ECU 18 controls the operation of the engine 10 via the signal line 18a. In addition, the motor/generator 16 generates electric power in response to the rotation of the engine 10. The electric power generated by the motor/generator 16 is supplied to the battery 26 by way of the power drive unit 24, so that the battery 26 is being electrically charged. In addition, the electric power is also provided to the battery 30 by way of the downverter 28, so that the battery 30 is electrically charged as well. The current detector 31 detects electric currents that flow from the power drive unit 24 to the battery 26, and the detection result is sent to the battery ECU 32.

Next, a description will be given with respect to a motor running anode in which the vehicle is driven by the driving power of the motor/generator 16.

When the driver depresses the pedal 20 (i.e. accelerator pedal), the engine ECU 18 produces a control signal based on the depression angle of the accelerator pedal if the remaining battery charge of the battery 26 is greater than a prescribed value. The control signal is supplied to the motor ECU 22 by way of the signal line 18b. Thus, the motor ECU 22 outputs a control signal to the power drive unit 24, which controls the rotation of the motor/generator 16.

The above description is an outline of the operations for the engine running mode, in which the vehicle is driven only by the engine 10 and the motor running mode, in which the vehicle is driven only by the motor/generator 16. Concretely speaking, the engine idling is controlled so as to be stopped by the engine ECU 18 in response to conditions established by signals output from sensors and switches as well as output signals of the air conditioner ECU 21, motor ECU 22 and battery ECU 32. That is, the engine idling is stopped under prescribed idle stop conditions, or the engine is restarted under prescribed engine restart condition.

Next, descriptions will be given with respect to controls for the engine idling to be stopped or restarted.

To reduce the amount of exhaust gas and improve the drivability (or manual operation to handle the vehicle), the engine automatic start stop control apparatus of the present embodiment stops and restarts the idling of the engine under the following conditions.

(1) Engine Stop During Deceleration

The apparatus automatically stops the engine in response to the driver's intention to stop the vehicle which is detected when the driver depresses the clutch pedal and all of the following conditions are met:
- (i) The running speed of the vehicle is lower than prescribed speed.
- (ii) The driver continues to depress the brake pedal.
- (iii) The engine speed is lower than a prescribed value.

For example, the apparatus automatically stops the engine when the driver depresses the clutch pedal under conditions where the driver continues depressing the brake pedal at a low running speed which is under 30 km/h so that the engine speed becomes lower than 1000 rpm. Even if the engine is automatically stopped because the aforementioned conditions are met, the engine is restarted when the driver changes gears. The engine is also restarted if the vehicle is not completely stopped so that the vehicle still continues running.

(2) Idle Stop of the Engine when the Vehicle is Stopped

The apparatus automatically stops the engine in response to the driver's intention to stop the vehicle, which is detected when the driver depresses the clutch pedal or shifts the gear to neutral at a low running speed which is lower than a prescribed running speed. For example, the engine is stopped when the driver depresses the clutch pedal or shifts the gear to neutral at a low running speed which is lower than 5 km/h. Even if the engine is stopped because of the aforementioned conditions being met, the engine is restarted when the driver changes gears. The engine is also restarted if the vehicle is not completely stopped so that the vehicle still continues running. The control of mode (2) is performed independently of the control of the aforementioned mode (1). That is, the present embodiment is not designed such that the engine is restarted after the engine is stopped by the controls of the aforementioned mode (1), then, the engine is stopped again by the controls of this mode (2). In other words, the controls of this mode (2) are used to stop the engine even if the foregoing conditions of mode (1) are not met because the driver makes a special operation such that the vehicle is decelerated by depression of the clutch pedal only at a running speed of 40 km/h, for example.

(3) Idle Stop Inhibition of the Engine After Restarting

This mode is provided to respond to a special gear shifting operation in which the driver shifts to neutral again after the vehicle starts to run again in an in-gear state. That is, the apparatus once allows the engine idling to be stopped in response to the gear-change operation. However, if the driver makes shift gears twice or more, the apparatus prevents the engine idling from being stopped until the running speed of the vehicle reaches a prescribed speed, e.g., 3 km/h. When driving in congested traffic, the driver frequently repeats stop and go operations in which the vehicle runs a small distance at a low speed, then, the vehicle is stopped by shifting to neutral. If such operations are continuously repeated in an engine stop mode in which the engine is stopped so that the vehicle runs with the driving power of the battery, there would be very high consumption of the electric power of the battery. For this reason, the present apparatus is designed in principle to allow the engine idling to be stopped in response to a single gear-change operation in which the driver shifts to neutral if the vehicle starts to run in an in-gear state, but the running speed does not reach the prescribed speed. However, the present apparatus prevents the engine idling from being stopped if the vehicle starts to run again in the in-gear state, and then, the driver shifts the gear to neutral again before the running speed reaches the prescribed speed.

The above describes the basic controls for the engine idling to be stopped and restarted. The present embodiment is designed to perform more precise controls, which will be described below.

(4) Sudden Acceleration Measure

This measure is provided to prevent the vehicle from suddenly starting, regardless of the driver's intention, because of idle stop release conditions of the engine being established during an idle stop mode. The present apparatus allows the engine to restart during the idle stop mode under each of the following conditions:
- (i) During the idle stop mode of the engine, the driver depresses the accelerator pedal while depressing the clutch pedal in neutral gear.
- (ii) The remaining battery charge of the battery becomes lower than the prescribed value.
- (iii) Restarting the engine is requested by the air conditioner.

The aforementioned conditions excludes the condition wherein restarting the engine is allowed by merely shifting the gear to neutral, because it is necessary to avoid sudden starting of a vehicle in which a problem occurs in the switch detecting the "neutral" state malfunctions and incorrectly outputs a signal stating that the gear is in the "neutral" state.

(5) Idle Stop Notification

In order to notify the driver that the apparatus stops the engine idling, the warning device 34 (see FIG. 2) turns on and off the light to indicate that the engine idling is stopped.

For example, the warning device 34 turns on and off the light when the driver releases the clutch pedal so that the clutch is placed in a fully closed state under the conditions wherein the engine idling is controlled to be stopped for a vehicle which is stopped. Restarting the engine is not necessarily carried out only to comply with the driver 's intention to restart the vehicle. That is, the engine is also restarted if the remaining battery charge of the battery 26 becomes lower than a prescribed value, which is described in connection with the aforementioned mode (4). The engine is not restarted unless the driver depresses the clutch pedal. Hence, the apparatus informs the driver of an engine restart request in response to depression of the clutch pedal.

(6) Alarm Sound

This is provided to respond to the driver mistakenly judging that the vehicle is completely stopped because the engine idling is stopped. In this case, the warning device 34 informs the driver of the idle stop mode by producing an alarm sound or by turning on the light indicating the idle stop mode.

(7) Cooperation with Air Conditioner

The apparatus determines whether to stop the engine idling in response to operating conditions of the air conditioner. Normally, the air conditioner is provided to control the interior temperature of the vehicle. If the driver feels that the interior temperature is very low or high, the driver operates the air conditioner to rapidly decrease or increase the temperature. In this case, if the apparatus has a priority to consume the electric power of the battery by which the air conditioner is controlled to be stopped under the idle stop mode, the comfort of the vehicle is adversely affected. To prevent such a disadvantage, the apparatus controls the engine idling to be stopped, or the apparatus disregards the operating conditions of the air conditioner, (8) Control Based on the Detection Result of Brake Master Power Negative Pressure Sensor Cars are commonly equipped with servo devices that assist drivers to reduce pressure required to apply the brakes. If the driver continues depressing the brake pedal under an engine stop mode, the negative pressure of the servo device decreases, and the servo assistance to depression for the brake pedal is correspondingly decreased. This requires the driver to apply much pressure by the brake pedal. In this case, the apparatus starts the engine to secure sufficient negative pressure for the servo device of the brake.

(9) Improvement of Manual Operations for Handling the Vehicle

In order to improve manual operations for the driver to handle the vehicle, there are provided the following two types of control by the apparatus. The first type of control is to inhibit the engine idling from being stopped for a prescribed time (e.g., two minutes) after the driver turns on an ignition switch. The second type of control is to inhibit the engine idling from being stopped when the driver has selected a reverse gear. It is necessary to perform the first type of control for the following reasons:

Normally, the engine remains warm for an hour or so after the driver has parked the vehicle, so it may be possible to stop the engine idling. Therefore, when driving in a parking area, the driver may have to slow down the vehicle, and as a result, it would be inconvenient for the driver if the apparatus were to repeat to stop and restart the engine idling while the vehicle drives in a parking area at a low speed. To prevent such an inconvenience, the present invention employs the first type of control to improve functions.

It is necessary to perform the second type of control for the following reasons:

In order to park the vehicle in a garage, the driver repeats forward and reverse driving of the vehicle. As a result, it would be inconvenient for the driver if the apparatus were to stop the engine idling every time the vehicle moved forwards or backwards. To prevent such an inconvenience, the present invention employs the second type of control to improve functions.

Next, idle stop conditions and restart conditions of the engine will be described with reference to FIGS. 3A and 3B. Specifically, FIG. 3A is a logic diagram showing the idle stop conditions of the engine, and FIG. 3B is a logic diagram showing the restart conditions of the engine.

Figure 3A:
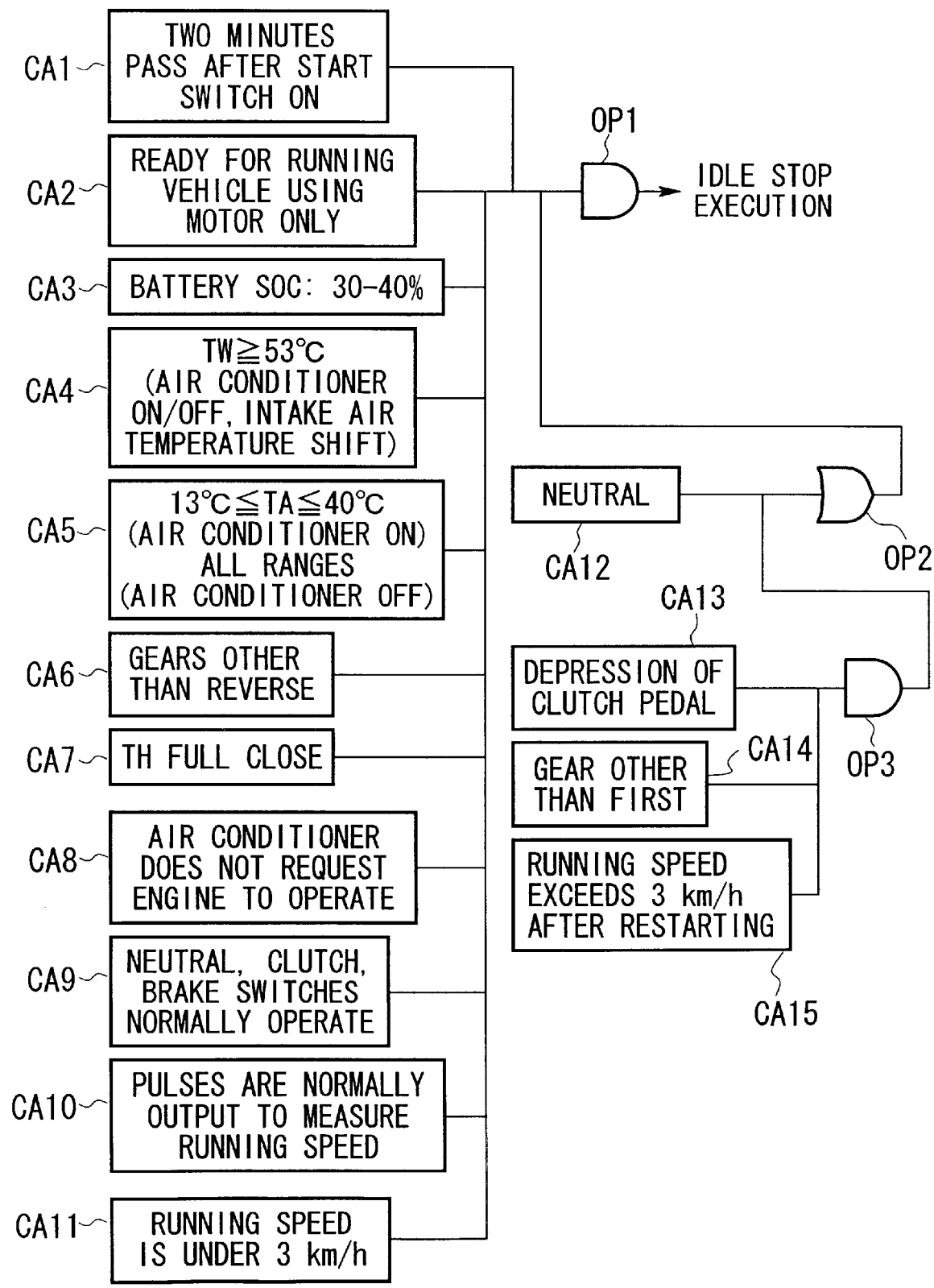
FIG. 3A is a logic diagram showing a sequence of conditions for determination and control for stopping an idling engine.
Figure 3B:
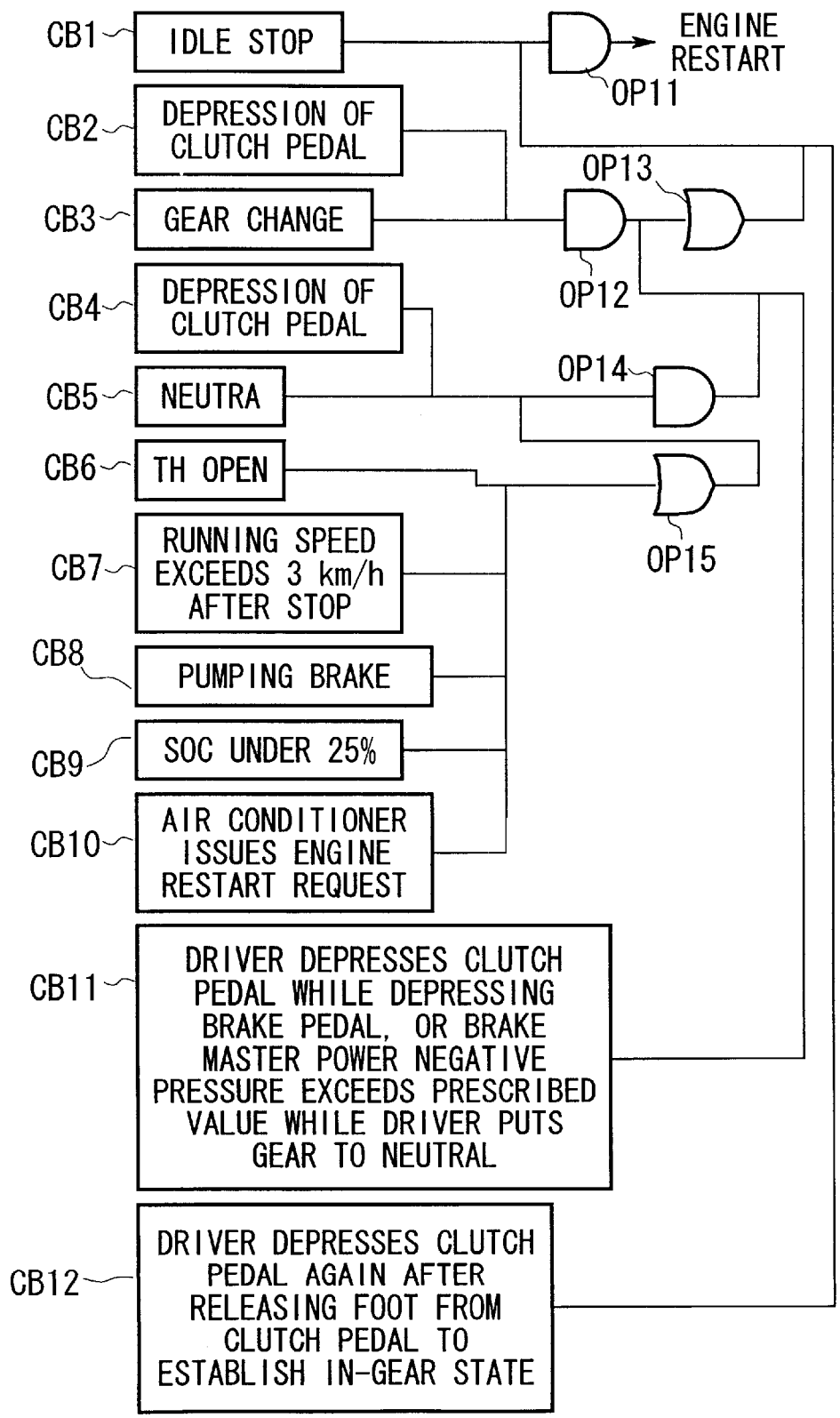
FIG. 3B is a logic diagram showing a sequence of conditions for determination and control for restarting an engine.

In FIG. 3A, conditions CA13 to CA15 are logically connected together by an AND operator OP3. In addition, the condition CA12 and the output of the AND operator OP3 are logically connected together by an OR operator OP2. Further, the output of the OR operator OP2 and conditions CA1 to CA11 are logically connected by an AND operator OP1. Thus, the AND operator OP1 outputs a signal implementing the stopping of the engine idling. That is, the apparatus stops the engine idling when all the conditions CA1 to CA11 and the conditions CA13 to CA15 are established or when all of the conditions CA1 to CA11 and the condition CA12 are established.

Specifically, the condition CA1 is established when a prescribed time (e.g., two minutes) elapses after a starter switch is turned on. This condition CA1 is used for the first type of control described in (9). The condition CA2 is established when the vehicle is ready for starting using only the motor/generator 16 shown in FIG. 2. In the case of the hybrid vehicle, only the motor/generator 16 is frequently used to restart the vehicle after the engine idling is stopped in order to reduce exhaust gas. Therefore, the condition CA2 is a precondition for the idle stop of the engine.

The condition CA3 is established if remaining battery charge of the battery 26 is within a prescribed range, which is between 30% and 40% of full battery charge, for example. Like the aforementioned conditions CA3, the hybrid vehicle frequently uses only the motor/generator 16 to restart after the engine idling is stopped in order to reduce exhaust gas. Therefore, the condition CA3 is a precondition for the idle stop of the engine.

Next, a description will be given for the remaining battery charge of the battery 26. Generally speaking, the battery 26 has different characteristics in connection with high and low remaining battery charges. With a high remaining battery charge (e.g., 80% or more of the full battery charge), the output voltage of the battery 26 increases substantially in proportion to the remaining battery charge. With a low remaining battery charge (e.g., 20% of the full battery charge), the output voltage of the battery 26 decreases in proportion to the remaining battery charge. If the remaining battery charge is moderate or appropriate, in other words, if the remaining battery charge is with a prescribed range of electricity between 20% and 80% of the full battery charge, the output voltage of the battery 26 remains substantially constant. For practical use, this a range of charge is used for the battery 26. As described above, the practical use range of the battery is determined in connection with the remaining battery charge. In order to ease controls with regard to accumulated electricity, the present embodiment provides three different control zones (or ranges) in consideration of the remaining battery charge of the battery 26 and consumption of the electricity of the battery 30.

Figure 4A:
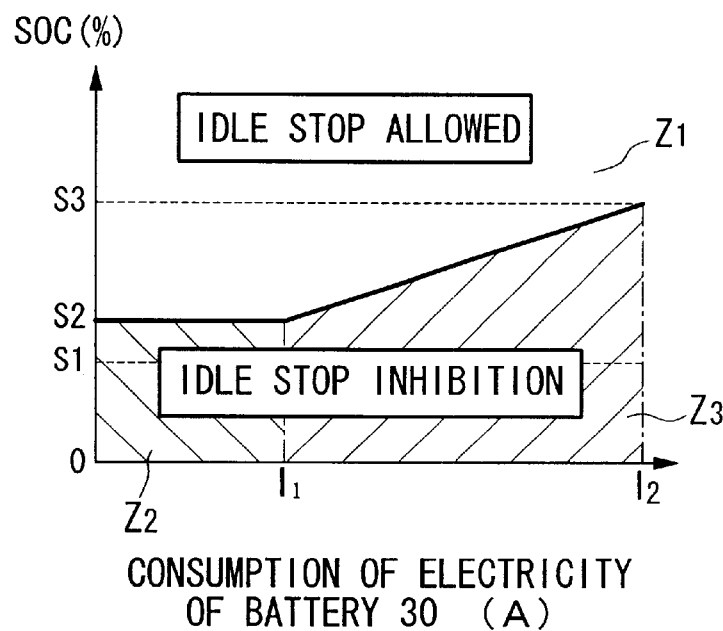
FIG. 4A is a graph showing zones for idle stop control modes of an engine in connection with the relationships between the remaining battery charge and the consumption of electricity.
Figure 4B:
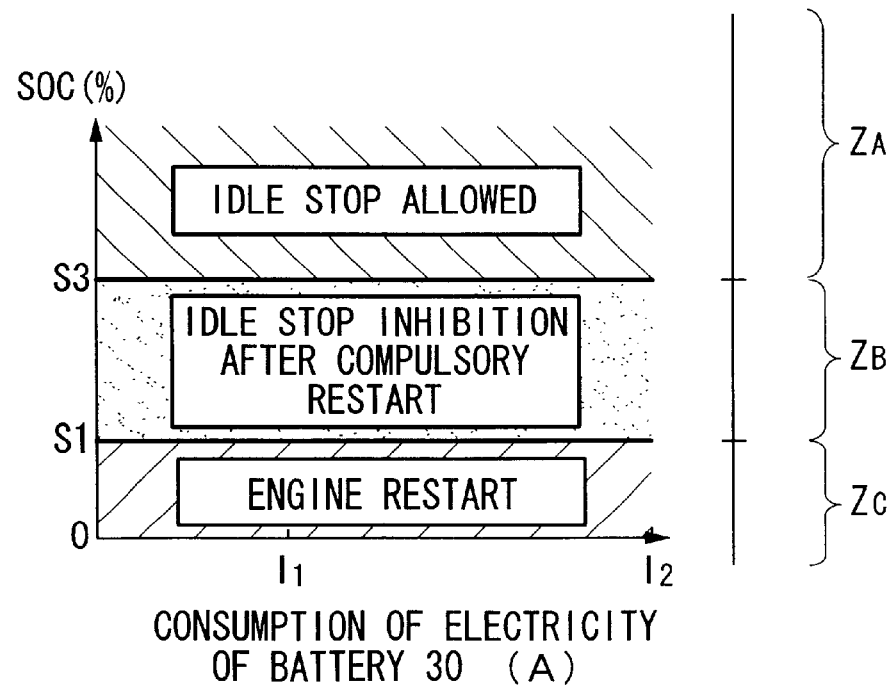
FIG. 4B is a graph showing zones for idle stop and restart controls of an engine in connection with the relationships between the remaining battery charge and the consumption of electricity.

The present embodiments sets various control zones in response to the remaining battery charge (SOC) of the battery 26, which will be described with reference to FIGS. 4A and 4B. FIG. 4A is used to explain decisions as to whether the engine idling is stopped in a normal running mode of the vehicle. FIG. 4B is used to explain decisions as to whether the engine is restarted during an idle stop mode of the engine.

FIG. 4A shows three zones for the decision on whether to stop the engine idling, wherein those zones are mainly classified in consideration of the remaining battery charge of the battery 30 and the consumption of the electricity of the battery 30. That is, in the first zone $Z_1$ execution of the idle stop of the engine is allowed because the remaining battery charge of the battery 26 is high. In the second zone $Z_2$, the idle stop of the engine is prohibited because the consumption of electricity of the battery 30 is small and the remaining battery charge of the battery 26 is relatively low. In the third zone $Z_3$, the idle stop of the engine is prohibited because the consumption of electricity of the battery 30 is large.

In the graph of FIG. 4A, three values are plotted as S1, S2, S3 on the vertical axis indicating the remaining battery charge (SOC). S1 designates the lower limit in the use zone of the battery 26, e.g., 20%. S2 designates a boundary used for determination of execution of the idle stop of the engine if the consumption of electricity of the battery 30 is relatively small, In addition, the two values $I_1$, and $I_2$ are shown on a horizontal axis with respect to the consumption of electricity of the battery 30, which is represented using the amount of current (Amperes) being consumed. The aforementioned values S2, S3 and the values $I_1$, $I_2$ are used for determination of whether to stop the engine idling if the consumption of electricity of the battery 30 becomes large. That is, four parameters are used to control the idle stop of the engine if the consumption of electricity of the battery 30 becomes large. This is because the remaining battery charge of the battery 26 is reduced in a short period of time if the consumption of electricity of the battery 30 becomes large. For this reason, the present embodiment sets strict conditions for allowing the execution of the idle stop of the engine. That is, the present embodiment makes every effort to prevent the remaining battery charge from being reduced in a short period of time by allowance of execution of the idle stop of the engine if the remaining battery charge is relatively high.

In FIG. 3, the conditions CA4, CA5 are used for allowance of the idle stop of the engine in response to the operations of the air conditioner and are established if the outside air temperature TA and the water temperature TW are within prescribed ranges. Generally, the air conditioner operates when the driver intentionally sets a certain temperature. If stopping of the engine idling is carried out without regard for the operation of the air conditioner, there is the possibility that the comfort of the passenger compartment will be adversely affected due to the idle stop of the engine. So, it is necessary to provide the condition CA5. For the idle stop of the engine is executed, the engine does not discharge high temperature exhaust gas, which is produced due to fuel combustion, so that the operating temperature of the catalyzer is reduced. A temperature reduction of the catalyzer causes an increase of discharged gas. The condition CA4 is used to avoid a temperature reduction of the catalyzer to avoid increasing the amount of the discharge gas. This condition is related to the control of the aforementioned mode (7).

Figure 5A:
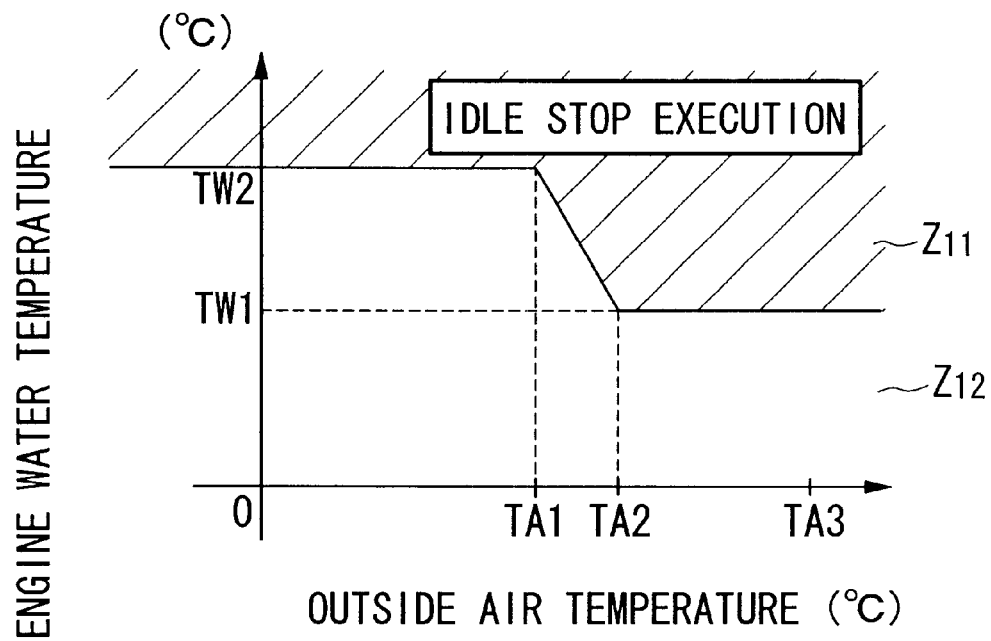
FIG. 5A is a graph showing the conditions for the idle stop control of the engine when the air conditioner is stopped.
Figure 5B:
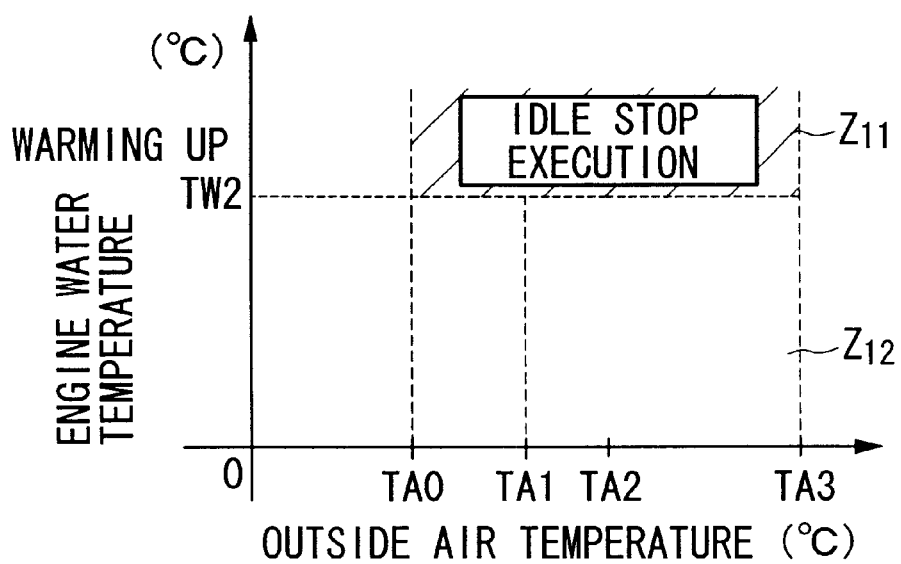
FIG. 5B is a graph showing the conditions for the idle stop control of the engine when the air conditioner is operating.

Next, the relationship between the conditions CA4 and CA5 will be described with reference to FIGS. 5A and 5B. FIG. 5A shows the conditions to determine whether the idle stop of the engine is executed or not if the driver stops the air conditioner. FIG. 5B shows conditions to determine whether the idle stop of the engine is executed if the air conditioner is operating. Both FIGS. 5A, and 5B show two zones, namely, $Z_{11}$ designates the execution of the idle stop of the engine, and $Z_{12}$ designates prohibition of the idle stop of the engine. Incidentally, both of the graphs of FIGS. 5A and 5B are defined by a vertical axis representing the engine water temperature and a horizontal axis representing the outside air temperature.

If the air conditioner is stopped, the comfort of the passenger compartment of the vehicle is not affected so much even if the idle stop of the engine is executed to stop the compressor of the air conditioner. In this case, the present embodiment performs the controls in consideration of reduction of the operating temperature of the catalyzer. In FIG. 5A, if the engine water temperature is equal to or below a value TW1 (which is plotted on the vertical axis), the present apparatus does not execute idle stop of the engine, so that the engine 10 runs continuously. This is a basic control of the apparatus if the air conditioner is stopped. If the outside air temperature is lower than a preset value TA1 (which is plotted on the horizontal axis), it is observed that the operating temperature of the catalyzer is reduced at a rapid pace over a lapse of time. To respond to this, the present embodiment sets a value TW2 which is higher than the value TW1 with respect to the engine water temperature. That is, if the outside air temperature is equal to or below the preset value TA1, the apparatus executes idle stop of the engine if the engine water temperature is equal to or higher than the value TW2. In a temperature range in which the outside air temperature decreases from TA2 to TA1, the zone $Z_{11}$ allowing execution of the idle stop of the engine is narrowed in response to a slope between TW1 and TW2 with respect to the engine water temperature. Thus, it is possible to suppress the reduction of the operating temperature of the catalyzer by increasing the operating time of the engine. Incidentally, the values TA1 an d TA2 of the outside air temperature are set at 15° C. and 20° C. respectively, while the values TW1 and TW2 of the engine water temperature are set at 50° C. and 75° C. respectively.

If the air conditioner is operating, it is necessary to control the idle stop of the engine in consideration of the comfort of the interior space of the vehicle and the temperature reduction of the catalyzer. That is, if the outside air temperature is very low or very high, the apparatus does not execute the idle stop of the engine in consideration of the comfort of the interior space of the vehicle. In FIG. 5B, if the outside air temperature is under TA0 or if it is equal to or higher than TA3 (where the values TA0, TA3 are both plotted on the horizontal axis), the apparatus does not execute the idle stop of the engine. In addition, if the engine water temperature is equal to or below the value TW2, the apparatus does not execute the idle stop of the engine in consideration of the temperature reduction of the catalyzer. Incidentally, the values TA0 and TA3 of the outside air temperature are set at 10° C. and 30° C. respectively, for example.

In FIG. 3A, the condition CA6 is met if the driver selects a gear to other than reverse. It is described before that in order to park the vehicle in a garage, the driver drives the vehicle to repeatedly move forwards and backwards. It is inconvenient for the driver to handle the vehicle if the engine 10 is stopped every time the vehicle moves backward. For this reason, the apparatus does not execute idle stop of the engine if the driver puts gear to reverse. In other words, the idle stop of the engine is allowed if the driver puts the gear in other than reverse. This condition is provided for control of the aforementioned mode (9).

The condition CA7 determines whether the throttle (or accelerator) is fully closed, in other words, whether the driver depresses the accelerator pedal. If the driver is depressing the accelerator pedal, it is necessary to detect the driver's intention to accelerate the vehicle, so that the engine 10 should be operated. A fully closed state of the throttle (or accelerator) is judged as one condition for determining the driver's intention to stop the vehicle, so it is used as one condition for determining whether to execute the idle stop of the engine. The condition CA8 is established if the air conditioner does not issue an operation request signal of the engine 10. Some settings of the air conditioner give the highest priority to controlling the interior temperature of the vehicle in a designated manner. In this case, the air conditioner ECU 21 outputs an operation request signal of the engine 10 to the engine ECU 18. If such an operation request signal is output, it is necessary to operate the engine 10 to activate the compressor. In that case, it is impossible to execute idle stop of the engine. This condition is one of the conditions used for the control of the aforementioned mode (7).

The condition CA9 is met if all of switches for the neutral gear, the clutch pedal and the brake pedal operate normally. If there is a problem with those switches, there is a probability in that the vehicle is operating against the driver's intention. So, it is necessary to decide whether those switches operate normally in consideration of the engine speed, gear changes and running speed. This condition is one of the conditions used for the control of the aforementioned mode (4).

The condition CA10 determines whether pulse signals indicating the running speed of the vehicle are normally output. As described before, the wheels 14 are equipped with pulse generators each of which generates one pulse per rotation. So, the engine ECU 18 calculates the running speed of the vehicle in response to the intervals of time between pulses. Idle stop of the engine is executed even if the vehicle is stopped. If the pulse generator(s) becomes faulty, the engine ECU 18 may determine that the vehicle is stopped even when the vehicle is actually being accelerated. In that case, the apparatus will incorrectly execute the idle stop of the engine. The condition CA10 is provided to prevent the idle stop of the engine from being incorrectly executed. The condition CA11 determines whether the running speed of the vehicle is equal to or below a prescribed value (e.g., 3 km/h). This condition is used for determining whether the vehicle is stopped or not.

The condition CA12 determines whether the driver has set the gear to neutral. The condition CA13 determines whether the driver is depressing the clutch pedal. In order to stop the vehicle, the driver frequently sets the gear in neutral while depressing the clutch pedal. Therefore, the aforementioned conditions are used for determining whether to execute the idle stop of the engine.

The conditions CA14, CA15 are related to the determination of whether the driver has selected other than first. In the idle stop inhibition after restarting of the aforementioned mode (3), the apparatus prevents the idle stop of the engine if the driver repeats the foregoing gear-change operations in which the driver selects neutral again when the running speed does not reach the prescribed speed after the vehicle starts running in the in-gear state. In order to execute the idle stop of the engine, it is necessary to determine whether the driver has selected a gear to other than first and whether the running speed of the vehicle has increased to be equal to or higher than the prescribed speed.

Next, a description will be given of the conditions for restarting the engine under the idle stop mode with reference to FIG. 3B.

In FIG. 3B, conditions CB6 to CB10 are logically connected by an OR operator OP15. The output of the OR operator OP15 and conditions CB4, CB5 are logically connected by an AND operator OP14. The conditions CB2 and CB3 are logically connected together by an AND operator OP12. The output of the AND operator OP12, the output of the OR operator OP14 and the condition CB11 are logically connected by an OR operator OP13. The output of the OR operator OP13 and the conditions CB1 and CB12 are logically connected by an AND operator OP11. Thus, the AND operator OP11 outputs a signal instructing the restarting of the engine.

The condition CB1 determines whether the engine idling is stopped. The engine is restarted after the idle stop of the engine, hence, it is natural to introduce the condition CB1 for the determination of the engine restart. The condition CB2 determines whether the driver is depressing the clutch pedal. The condition CB3 detects a gear change being made by the driver. The conditions CB2 and CB3 are included in the conditions for restarting the engine because the driver normally depresses the clutch pedal and changes gears in order to start the engine.

The condition CB4 determines whether the driver is depressing the clutch pedal. The condition CB5 detects whether the driver has shifted to neutral.

The condition CB6 determines whether the accelerator (or throttle) is fully opened. The condition CB6 is logically connected with the conditions CB4, CB5 by way of the AND operator OP14 and the OR operator OP15. This logic is provided to detect a specific condition wherein the driver depresses the clutch pedal while shifting the gear to neutral under the idle stop condition. As the result, if the driver depresses the accelerator pedal under these specific conditions, the apparatus determines that the driver intents to start the engine 10, and the apparatus controls the engine 10 so as to restart. In this case, if the driver were to performs the aforementioned operations but the engine 10 fails to restart, the driver feels that an engine problem has occurred. In order to ease inconvenience in handling the vehicle, the apparatus certainly controls the engine 10 to restart when the aforementioned conditions are established.

The condition CB7 determines whether after the vehicle is stopped, the running speed becomes greater than a prescribed speed (e.g., 3 km/h).

The condition CB8 determines whether the driver is performing a so-called brake pumping technique. If the driver is pumping the brake during the idle stop mode, the negative pressure of the servo device is somewhat reduced so that the depression pressure applied to the brake pedal has to increase to certainly depress the brake pedal. The condition CB8 is provided to prevent such a reduction of the servo device negative pressure, Incidentally, the condition CB8 is provided for control of the aforementioned mode (8).

The condition CB9 determines whether the remaining battery charge of the battery 26 is equal to or below 25% of the full battery charge. If the apparatus continues the idle stop mode under a low remaining battery charge, the electric loads 29 (see FIG. 2) consume the electricity of the battery 30 rapidly. To maintain a certain level of remaining battery charge of the battery 30, electric charging of the battery 30 is effected by the battery 26 via the downverter 28. If such charging operation is continued for a long time, remaining battery charge of the battery 26 becomes too small to restart the engine 10. To avoid such a drawback, a reduction of the remaining battery charge is one condition for restarting the engine. This condition is one of the conditions for control of the aforementioned mode (4).

Next, a description will be given for the remaining battery charge for restarting the engine with reference to FIG. 3B. FIG. 3B shows the relationships between the remaining battery charge (or SOC) of the battery 26 and the consumption of electricity of the battery 30. In response to the remaining battery charge, the present embodiment sets three control zones, namely, $Z_A$, $Z_B$ and $Z_C$. That is, the zone $Z_C$ designates an engine restart which is compulsorily carried out because the remaining battery charge is low. The zone $Z_B$ designates idle stop prevention in which the apparatus prevents idle stop of the engine from being executed even if compulsory restart of the engine is not required because the battery 26 is sufficiently charged by the engine being compulsorily restarted. This is supported by assumption that the time required for compulsorily restarting of the engine becomes short by execution of the idle stop of the engine even if the battery 26 is charged by the engine being compulsorily restarted so that the remaining battery charge thereof becomes higher than a prescribed value S1 (which is plotted on a vertical axis). That is, it is expected that the apparatus would frequently repeat stopping and restarting the engine idling even if the remaining battery charge is higher than S1. This deteriorates the drivability and manual operations to handle the vehicle. For the reasons described above, the present embodiment prevents the idle stop of the engine from being executed in the zone $Z_B$ of the remaining battery charge. Zone $Z_A$ designates allowance of execution of idle stop of the engine after compulsory restarting of the engine. In zone $Z_A$ in which the remaining battery charge is high, it is expected that the apparatus will not frequently repeat stopping and restarting of the engine 10 even if the idle stop of the engine is executed. For this reason, the present embodiment allows execution of the idle stop of the engine in the zone $Z_A$.

The condition CB10 determines whether the air conditioner has issued an engine restart request. This condition is provided to maintain comfort of the passenger compartment of the vehicle, in other words, it is one of the conditions for control of the aforementioned mode (4). The condition CB11 determines whether the driver is depressing the clutch pedal while depressing the brake pedal or determines whether the brake master power negative pressure becomes equal to or greater than a prescribed value in gauge pressure when the gear is in the neutral position. An example of the prescribed value in gauge pressure is −250 mmHg. The condition CB11 is used for control of the aforementioned mode (8).

The condition CB12 determines whether, after the driver releases the clutch pedal to establish an in-gear state, the driver again depresses the clutch pedal. In order to start the vehicle, the driver generally depresses the clutch pedal deeply to establish an in-gear state, then, the driver depresses the accelerator pedal while releasing the clutch pedal. In order to start the vehicle in a hurry, the driver frequently conducts operations to release the clutch pedal and establish the in-gear state simultaneously. In such a situation, if the driver fails to timely start the engine, it is impossible to obtain sufficient acceleration when starting the vehicle. For this reason, the present embodiment determines that the driver makes a mistake in manual operations when the driver depresses the clutch pedal again after releasing his/her foot from the clutch pedal to establish the in-gear state. In that case, the apparatus allows the engine to restart.

As described above, the present embodiment sets a variety of conditions for determination of the idle stop and restart of the engine. In order to improve fuel efficiency, the apparatus performs a fuel stop control to the engine 10 during deceleration. This is called a fuel cut, which will be referred to as "deceleration F/C".

Figure 6A:
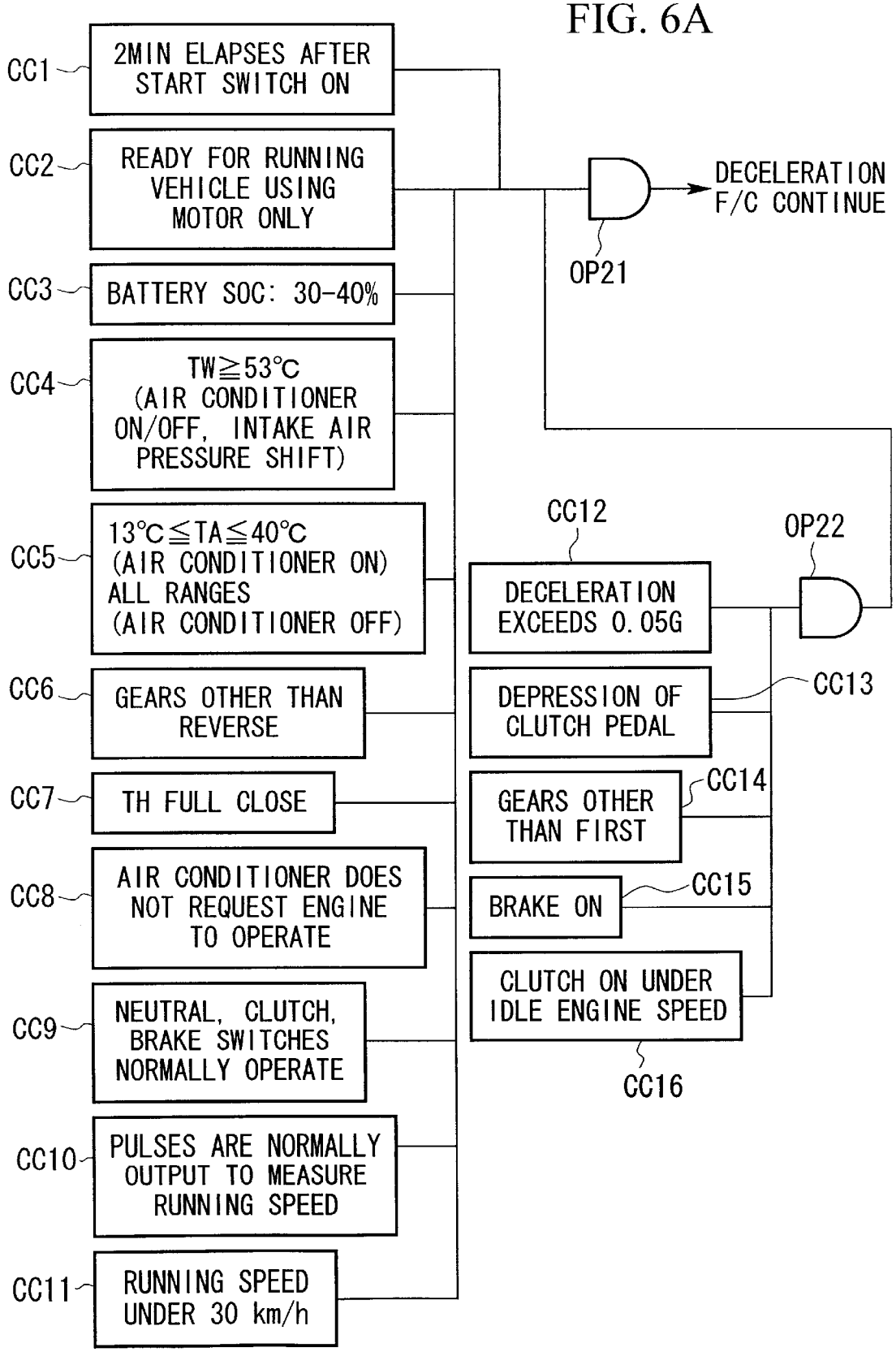
FIG. 6A is a logic diagram showing the sequence of conditions for determination and control of deceleration fuel cut.
Figure 6B:
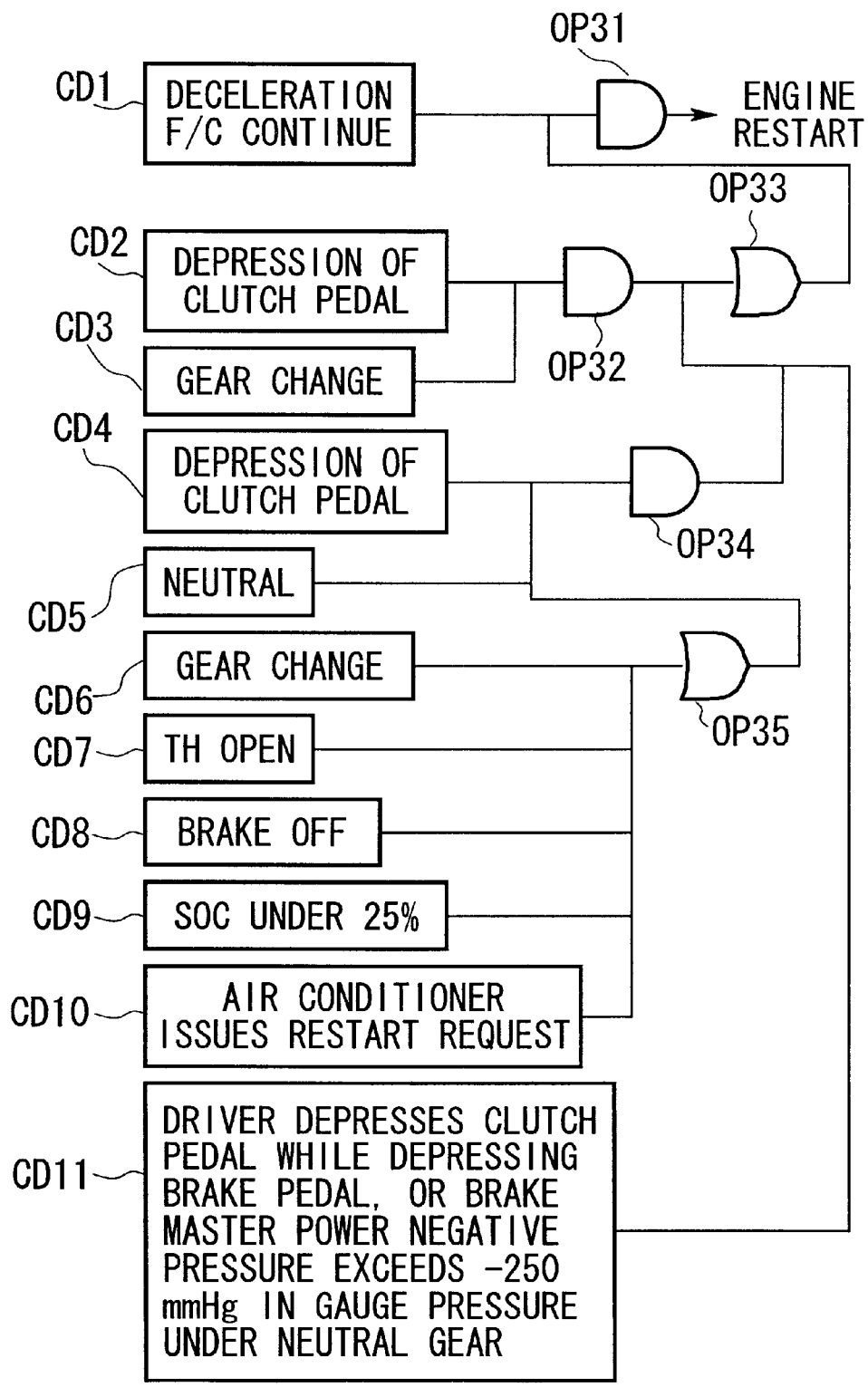
FIG. 6B is a logic diagram showing the sequence of conditions for determination and control of restoration from the deceleration fuel cut.

Next, a description will be given with respect to conditions for the fuel stop control. FIGS. 6A and 6B show summaries of next fuel stop control conditions and restoration conditions in accordance with the present embodiment. Specifically, FIG. 6A shows the fuel stop control conditions, and FIG. 6B shows the restoration conditions.

In FIG. 6B, conditions CC12 to CC16 are logically connected by an AND operator OP22. The output of the AND operator OP22 and conditions CC1 to CC11 are logically connected by an AND operator OP21. In short, only when all the conditions CC1 to CC16 are established, the deceleration F/C is carried out or continued.

The conditions CC1 to CC10 shown in FIG. 6A are respectively identical to the foregoing conditions CA1 to CA10 shown in FIG. 3A. The condition CC11 determines whether the running speed of the vehicle is equal to or below a prescribed value. Herein, the prescribed value of the running speed is set at 30 km/h, for example. The condition CC12 determines whether deceleration is equal to or greater than a prescribed value. Herein, the prescribed value of the deceleration is set at 0.05 G, for example. This condition CC12 is used to determine whether the vehicle is being decelerated or not. In order to stop the vehicle, the driver generally depresses the clutch pedal. Therefore, the condition CC13 is listed as one of the conditions for determination of whether the driver wishes to stop the vehicle.

The condition CC14 determines whether the driver has selected a gear to other than first. First gear is selected when all of the conditions CC1 to CC12 are established. The first gear is used even when the driver does not intend to stop the vehicle. Therefore, the present embodiment uses the condition CC14 for determination of the deceleration, so that selecting the first gear is detected not to perform the deceleration F/C. The condition CC15 determines whether the driver is depressing the brake pedal. In order to stop the vehicle, the driver generally depresses the brake pedal. Therefore, the condition CC15 is listed as one of the conditions for determination of whether the driver wishes to stop the vehicle. The condition CC16 determines whether the driver is releasing the clutch pedal under a low engine speed where engine speed is under an idle speed.

Next, the restoration conditions for the deceleration F/C will be described with reference to FIG. 6B.

In FIG. 6B, conditions CD6 to CD10 are logically connected together by an OR operator OP35. The output of the OR operator OP35 and conditions CD4, CD5 are logically connected by an AND operator OP34. Conditions CD2 and CD3 are logically connected by an AND operator OP32. The outputs of the OR operator OP34 and the condition CD11 are logically connected by an OR operator OP33. The output of the OR operator OP33 and the condition CD1 are logically connected by an AND operator OP31. Thus, the AND operator OP31 outputs a signal instructing restart of the engine which is restored from the deceleration F/C.

The condition CD1 determines whether the apparatus is continuing deceleration F/C. The condition CD2 determines whether the driver is depressing the clutch pedal. The condition CD3 determines whether the driver is changing gears. Those conditions are listed for the determination of the engine restart in consideration of the normal operations by a driver who depresses the clutch pedal and makes a gear change in order to start the engine.

The condition CD4 determines whether the driver is depressing the clutch pedal. The condition CD5 determines whether the driver has put gear into neutral.

The condition CD6 determines whether the driver is changing gears. The condition CD7 determines whether the accelerator (or throttle) is opened. This condition CD7 is logically connected with the aforementioned conditions CD4 and CD5 by way of the OR operator OP35 and the AND operator OP34. That is, when the driver depresses the accelerator pedal under the conditions that the driver is also depressing the clutch pedal and putting the gear to neutral while deceleration F/C is continued, the apparatus determines that the driver intends to start the engine 10, so that the engine 10 is restored from the deceleration F/C and is restarted. If the engine 10 were to fail to start even when the driver performs the aforementioned operations, the driver would feel that a problem has occurred in the engine 10. In order to improve the drivability and manual operation to handle the vehicle, the apparatus controls the engine 10 to be restored from the deceleration F/C when the aforementioned conditions are established.

The condition CD8 determines whether the driver has released the brake pedal. The condition CD9 determines whether the remaining battery charge of the battery 26 is equal to or below a prescribed value. Here, the prescribed value of the remaining battery charge is 25% of the full battery charge, for example. If the apparatus continues the idle stop of the engine with a low remaining battery charge, the electric loads 29 (see FIG. 2) consume the electricity of the battery 30. In order to maintain a certain level of electricity of the battery 30, the battery 30 is charged by the battery 26 by way of the downverter 28. If such charging operation is continued for a long time, the remaining battery charge of the battery 26 is reduced too much to restart the engine 10. To avoid such a drawback, a reduction of the remaining battery charge of the battery 26 is listed as one of the restoration conditions by which the engine 10 is restored from the deceleration F/C.

The condition CD10 determines whether the air conditioner has issued a restart request of the engine 10. This condition is one of the conditions for maintaining the comfort of the passenger compartment of the vehicle, in other words, it is one of the conditions for control of the aforementioned mode (4). The condition CD11 determines whether the driver is depressing the clutch pedal while depressing the brake pedal, or determines whether the brake master power negative pressure has become equal to or greater than a prescribed value in gauge pressure while the driver shifts to neutral. Herein, the prescribed value is set at −250 mmHg, for example. This condition is used for control of the aforementioned mode (8).

Next, descriptions will be given for the control flow for the application and actualization of the idle stop conditions and restart conditions shown in FIGS. 3A, 3B as well as the conditions for continuing the deceleration F/C and the restoration conditions shown in FIGS. 6A, 6B.

Figure 7:
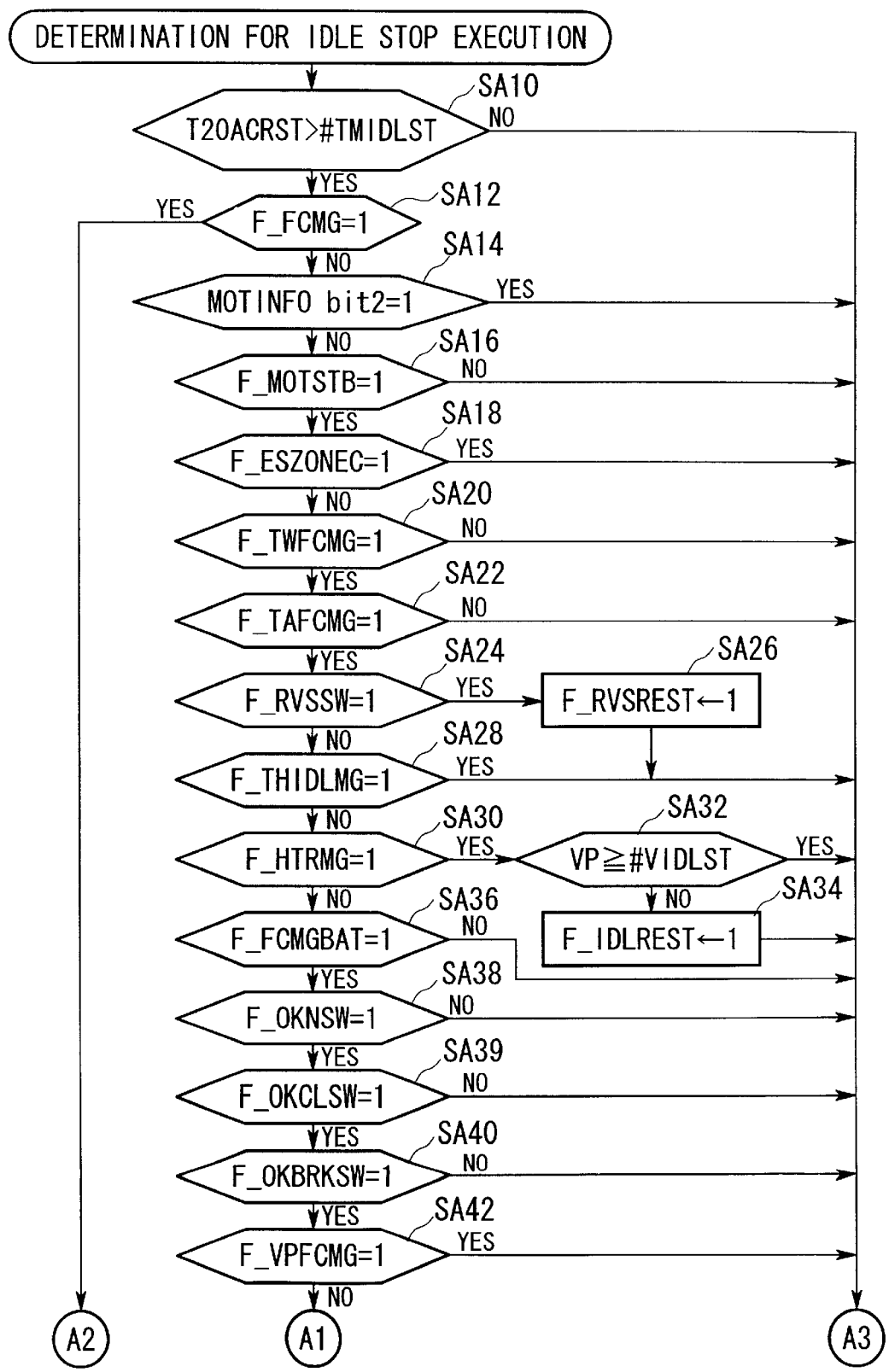
FIG. 7 is a flowchart showing the first part of an idle stop determination process in accordance with the first embodiment of the invention.
Figure 8:
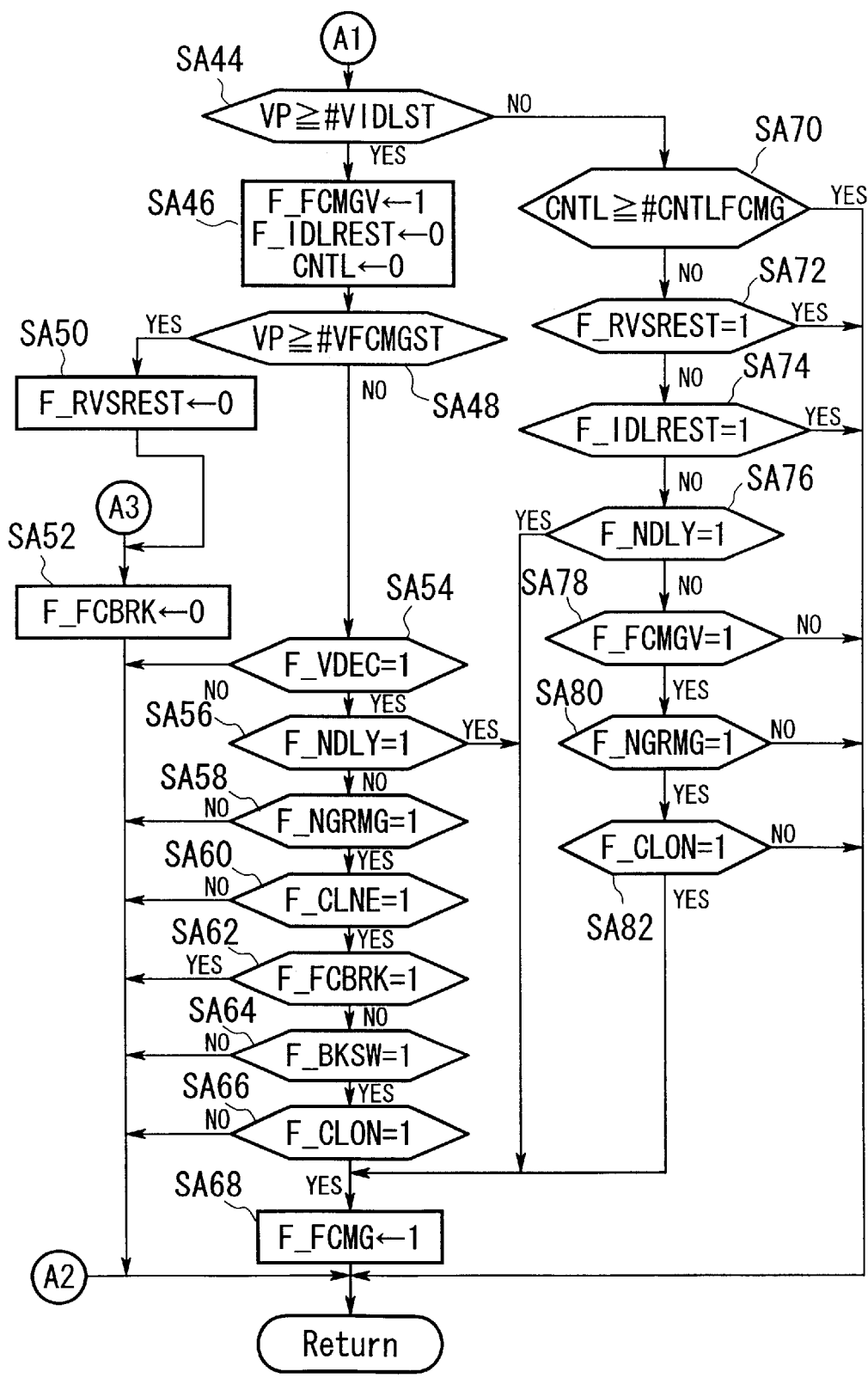
FIG. 8 is a flowchart showing the second part of the idle stop determination process in accordance with the first embodiment of the invention.

FIGS. 7 and 8 are flowcharts for determining whether to execute idle stop of the engine in accordance with the embodiment of the invention. The flows (or routines) of FIGS. 7 and 8 are called from a main routine (not shown) and are executed at constant time intervals, e.g., every 10 msec. Actually, the steps of these flows are executed by the engine ECU 18 shown in FIG. 2. A decision of whether to execute idle stop of the engine is made by a flag F_FCMG which is "1" in FIGS. 7 and 8. That is, when the flag F_FCMG is "1", the apparatus reverts control to the main routine to perform an idle stop control. If it is "0", the apparatus does not perform the idle stop control. Initially, the flag F_FCMG is set at "0".

When the apparatus calls the process of FIG. 7 from the main routine, the flow proceeds to step SA10 which makes a decision as to whether a prescribed time has elapsed from the starting time of turning on a starter switch (not shown). As the prescribed time, a time value of 120 seconds (i.e., two minutes) is set as the variable #TMIDLST in the step SA10. By comparison between the time value and the value of the timer T20ACRST, a determination is made as to whether the prescribed time has elapsed from the start time. The timer T20ACRST starts counting (or measuring) time when the starter switch is turned ON. If a decision result of the step SA10 is "NO", in other words, if the apparatus determines that the prescribed time have not elapsed from the starting time of turning on the starter switch, the flow proceeds directly to step SA52 shown in FIG. 8 in which the flag F_FCBRK is set to "0". Then, the flow reverts control to the main routine. Herein, the flag F_FCBRK indicates an OFF event of the brake while deceleration F/C is continued.

If the decision result of the step SA10 is "YES", the flow proceeds to step SA12 in which a decision is made as to whether a flag F_FCMG is "1". The process of FIGS. 7 and 8 are used to execute idle stop by setting the flag F_FCMG to "1". For this reason, if the flag F_FCMG has already been set to "1", the process becomes meaningless. Hence, if the decision result of the step SA12 is "YES", the flow reverts control to the main routine.

If the decision result of the step SA12 is "NO", in other words, if the flag F_FCMG is "0", the flow proceeds to step SA14.

In step SA14, a decision is made as to whether the second bit (bit 2) of the variable MOTINFO is "1". The second bit of the variable MOTINFO indicates whether the temperature of the battery 26 is equal to or below 0° C. The battery ECU 32 sets this if the temperature is equal to or below 0° C. If the decision result of the step SA14 is "YES", in other words, if the temperature of the battery 26 is equal to or below 0° C., the flow proceeds directly to step SA52 shown in FIG. 8. In step SA52, the flag F_FCBRK indicating an OFF event of the brake while the deceleration F/C is continued is set to "0". Then, the flow reverts control to the main routine.

If the decision result of the step SA14 is "NO", in other words, if the apparatus determines that the temperature of the battery 26 is higher than 0° C., the flow proceeds to step SA16.

In step SA16, a decision is made as to whether a flag F_MOTSTB is set to "1". Herein, the flag F_MOTSTB indicates whether the vehicle can be started with the motor/generator 16. The motor ECU 22 sets a value of the flag F_MOTSTB in response to the state of the motor/generator 16. If the decision result of the step SA16 is "NO", the flow proceeds to the step SA52, wherein the flag F_FCBRK indicating an OFF event of the brake while the deceleration F/C is continued is set to "0". Then, the flow reverts control to the main routine.

If the decision result of the step SA16 is "YES", the flow proceeds to step SA18.

In the step SA18, a decision is made as to whether a flag F_ESZONEC is set to "1". This flag F_ESZONEC is used to indicate idle stop inhibition because the remaining battery charge of the battery 26 belongs to the zone $Z_B$ or ZCshown in FIG. 4B. The battery ECU 32 (see FIG. 2) sets the flag F_ESZONEC. If the decision result of the step SA18 is "YES", the apparatus does not perform idle stop of the engine. The flow then proceeds to the step SA52, wherein the flag F_FCBRK is set to "0". Then, the flow reverts control to the main routine.

If the decision result of the step SA18 is "NO", so that the battery 26 is sufficiently charged to allow execution of the idle stop of the engine, the flow proceeds to step SA20.

In step SA20, a decision is made as to whether a flag F_TWFCMG is set to "1". Herein, the flag F_TWFCMG is used to indicate whether engine water temperature has increased to the extent that the idle stop of the engine can be executed. The engine ECU 18 sets the flag F_TWFCMG. Determination of whether the idle stop of the engine is executed is made in accordance with the aforementioned relationships between the engine water temperature and outside air temperature shown in FIGS. 5A and 5B. This determination will be described below.

The present embodiment estimates the outside air temperature by measuring the intake air temperature of the engine after the vehicle runs for a prescribed time. Using the estimated outside air temperature, the apparatus calculates a water temperature that enables idle stop of the engine. Based on a comparison between the calculated water temperature and actual engine water temperature, the engine ECU 18 sets flag F_TWFCMG to "1" or "0". Details of the aforementioned operations will be described below.

Figure 9:
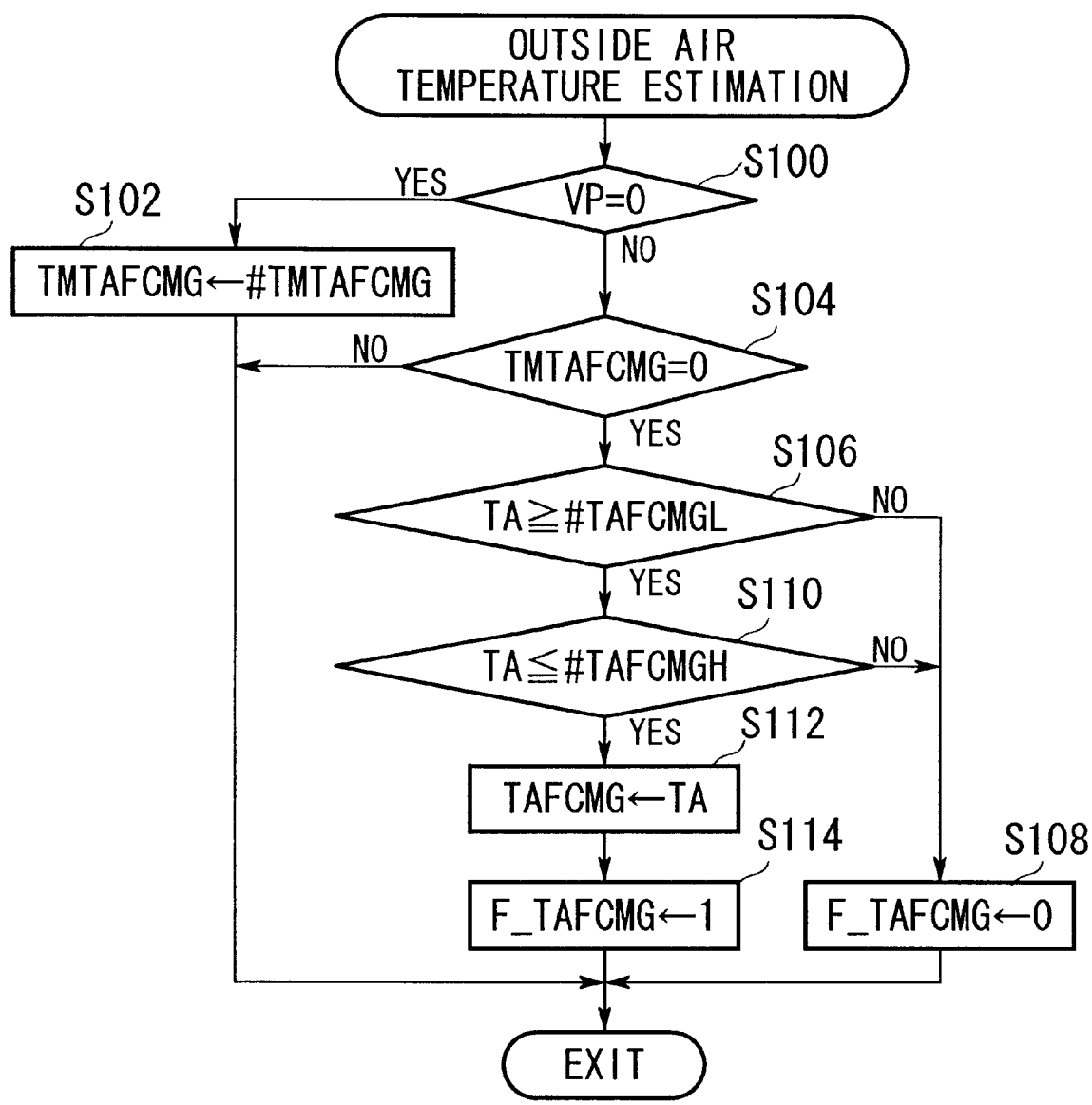
FIG. 9 is a flowchart showing a process for estimation of the outside air temperature.

FIG. 9 is a flowchart showing the steps for determining whether the estimated outside air temperature is in a temperature range enabling idle stop of the engine. The process of FIG. 9 is performed independently and in parallel with the aforementioned process of FIGS. 7 and 8. This process is performed at prescribed time intervals (e.g., 10 msec) by the engine ECU 18.

When the process of FIG. 9 is started, the flow first proceeds to step S100 in which a decision is made as to whether a variable VP is set to "0". Herein, the variable VP stores a number of pulses which are output from the pulse generator installed in the wheel 14 within a prescribed period of time. Namely, the variable VP indicates the running speed of the vehicle. That is, the step S100 determines whether the vehicle is stopped on the basis of the variable VP. If the decision result of the step S100 is "YES", the flow proceeds to step S102, wherein the engine ECU 18 substitutes a variable TMTAFCMG for the variable #TMTAFCMG. Herein, the variable TMTAFCMG is used to determine whether a prescribed time has elapsed after the vehicle starts running. So, the value to which the variable TMTAFCMG is set is subjected to subtraction in response to a lapse of time. In addition, the variable #TMTAFCMG stores the value to which the variable TMTAFCMG is set. In short, step S102 is used for initial setting of the variable TMTAFCMG. After completion of the step S102, the flow reverts control to the main routine.

If the decision result of the step S100 is "NO", in other words, if the apparatus determines that the vehicle is running, the flow proceeds to step S104. In step S104, a decision is made as to whether the variable TMTAFCMG is set to "0", in other words, a decision is made as to whether the prescribed time has elapsed after the vehicle starts running. If the decision result of the step S104 is "NO", the flow reverts control to the main routine. If it is "YES", the flow proceeds to step S106.

In step S106, a decision is made as to whether the outside air temperature TA is equal to or above a variable #TAFCMGL, wherein the present embodiment assumes that the outside air temperature is identical to the engine intake air temperature. Herein, the variable #TAFCMGL designates a lower limit value in the temperature condition for allowing idle stop of the engine. For example, it is set to −10° C. If the decision result of the step S106 is "NO", in other words, if the apparatus determines that the outside air temperature is too low to execute the idle stop of the engine, the flow proceeds to step S108 in which a flag F_TAFCMG is set to "0". Then, the flow reverts control to the main routine. Herein, the flag F_TAFCMG is related to the temperature condition for allowing the idle stop of the engine to be executed. If the flag F_TAFCMG is set to "1", the idle stop is allowed. If "0", the idle stop is prohibited.

If the decision result of the step S106 is "YES", the flow proceeds to step S110.

In step S110, a decision is made as to whether the outside air temperature TA is equal to or below a variable #TAFCMGH. Here, the variable #TAFCMGH designates an upper-limit value of the temperature for allowance of the idle stop of the engine. For example, it is set to 80° C. If the decision result of the step S110 is "NO", in other words, if the apparatus determines that the outside air temperature is too high to execute the idle stop of the engine, the flow proceeds to step S108, wherein the flag F_TAFCMG is set to "0". Then, the flow reverts control to the main routine, If the decision result of the step S110 is "YES", the flow proceeds to step S112.

In step S112, the engine ECU 18 substitutes the outside air temperature TA for the variable TAFCMG. Here, the variable TAFCMG is used for determination of the engine water temperature, which is one of the conditions for determining whether the idle stop of the engine is executed. After completion of the step S112, the flow proceeds to step S114 in which the flag F_TAFCMG (i.e., a temperature condition for determining whether idle stop of the engine is allowed) is set to "1". After completion of the step S114, the flow reverts control to the main routine.

Using the aforementioned variable TAFCMG which is estimated to represent the outside air temperature, the apparatus performs a process for determining whether the engine water temperature is in a water temperature range allowing idle stop of the engine or not.

Figure 10:
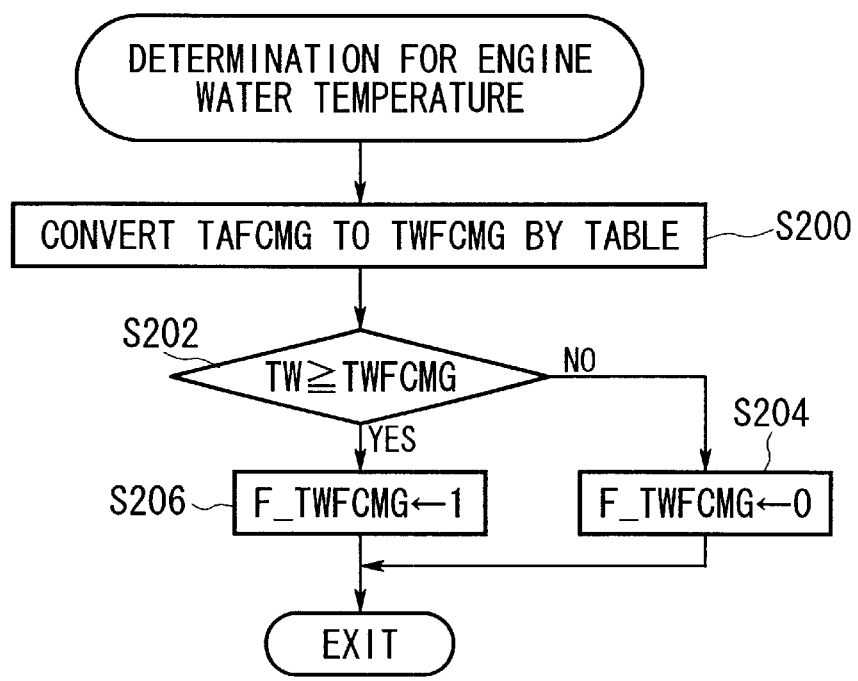
FIG. 10 is a flowchart showing a process for determination of the engine water temperature.

FIG. 10 is a flowchart showing the process for determining whether the engine water temperature is in the water temperature range allowing the idle stop of the engine. This process is performed independently of and in parallel with the foregoing processes of FIGS. 7, 8 and 9. The process of FIG. 10 is performed at prescribed intervals of time (e.g., 10 msec) by the engine ECU 18.

Figure 11:
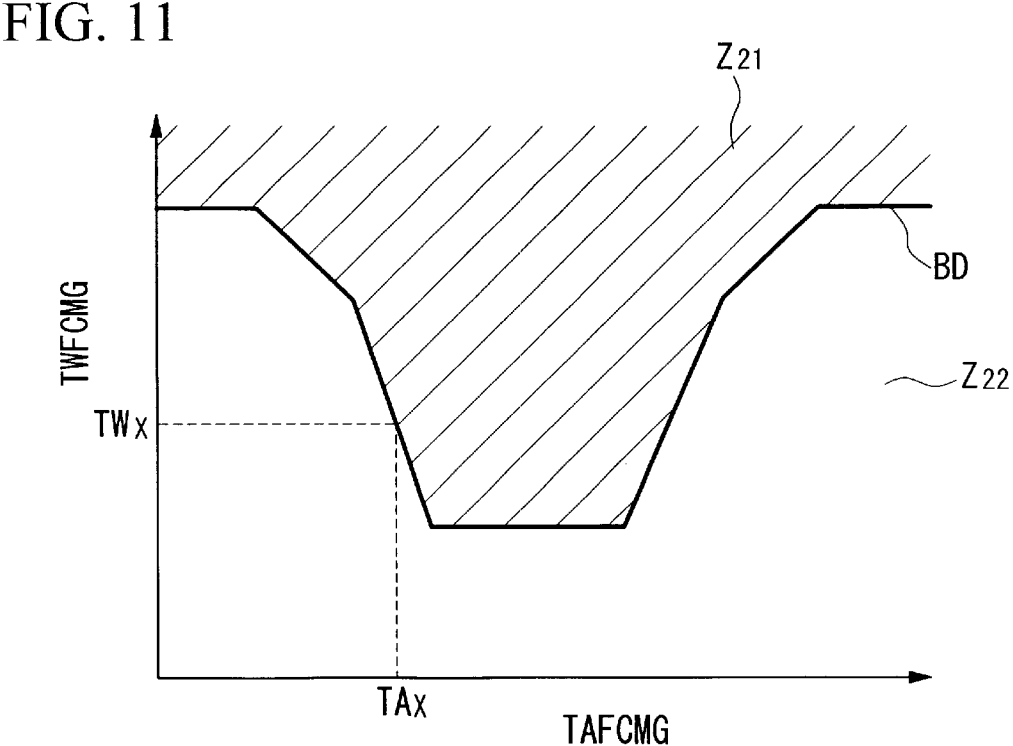
FIG. 11 is a graph showing the relationships between the engine water temperature and the outside air temperature used for determination of idle stop of the engine.

When the process of FIG. 10 is started, the flow first proceeds to step S200 in which the variable TAFCMG obtained by the process of FIG. 9 is converted to a variable TWFCMG with reference to a table showing the relationships between the engine water temperature and the outside air temperature used for determining whether idle stop of the engine is executed or not. Herein, the variable TWFCMG indicates the engine water temperature which is one of the conditions for determining whether the idle stop of the engine is executed. FIG. 11 shows the content of the table storing the relationships between the engine water temperature and outside air temperature used for determining whether the idle stop of the engine is executed. FIG. 11 shows two zones, namely $Z_{21}$ and $Z_{22}$, in connection with relationships between the variables TAFCMG and TWFCMG. That is, the idle stop of the engine is allowed if those variables lie in the zone $Z_{21}$. The idle stop of the engine is prohibited if those variables lie in the zone $Z_{22}$. The boundaries between the zones $Z_{21}$ and $Z_{22}$ vary in accordance with the curve BD to provide the aforementioned idle stop controls shown in FIGS. 5A and 5B. In the process of FIG. 10, conversion is carried out so that the variable TWFCMG is set to TWx when the variable TAFCMG is set to TAx in FIG. 11.

After completion of the step S200 which determines the engine water temperature TW, the flow proceeds to step S202 in which a decision is made as to whether the engine water temperature TW is equal to or above the variable TWFCMG. This step is used to determine whether the engine water temperature belongs to the zone $Z_{21}$ shown in FIG. 11 or not. If a decision result of the step S202 is "NO", the flow proceeds to step S204 in which the flag F_TWFCMG is set to "0". Idle stop of the engine is allowed when the flag F_TWFCMG is set to "1", while idle stop of the engine is prohibited when the flag F_TWFCMG is set to "0". After completion of the step S204, the flow reverts control to the main routine.

If the decision result of the step S202 is "YES", the flow proceeds to step S206 in which the flag F_TWFCMG is set to "1".

In FIG. 7, if the decision result of the step SA20 is "NO", the flow proceeds to step SA52 in which the flag F_FCBRK indicating an OFF event of the brake while the deceleration F/C is continued is set to "0". Then, the flow reverts control to the main routine.

If the decision result of the step SA20 is "YES", the flow proceeds to step SA22 in which a decision is made as to whether the flag F_TAFCMG is set to "1". If a decision result of the step SA22 is "NO", the flow proceeds to step SA52 in which the flag F_FCBRK indicating an OFF event of the brake while the deceleration F/C is continued is set to "0". Then, the flow reverts control to the main routine. If the decision result of the step SA22 is "YES", the flow proceeds to step SA24. By the aforementioned steps SA20 and SA22, it is possible to determine whether the outside air temperature and engine water temperature meet conditions for allowing the idle stop of the engine.

In step SA24, a decision is made as to whether a flag F_RVSSW is set to "1". Here, the flag F_RVSSW is set to "1" in a state where the driver puts gear to reverse, while it is set to "0" in other states. If the decision result of the step SA24 is "YES", the flow proceeds to step SA26 in which a flag F_RVSREST is set to "1". The flag F_RVSREST indicates a change of direction of movement of the vehicle in which the vehicle originally moving forwards is changed to move backwards. Once the flag F_RVSREST is set to "1", it is maintained until running speed of the vehicle reaches a prescribed speed. Namely, the apparatus inhibits idle stop of the engine of the vehicle which is moving backward so that the flag F_RVSREST is set to "1". After completion of the step SA26, the flow proceeds to step SA52 in which the flag F_FCBRK indicating an OFF event of the brake while the deceleration F/C is continued is set to "0". Then, the flow reverts control to the main routine. If the decision result of the step SA24 is "NO", the flow proceeds to step SA28.

In step SA28, a decision is made as to whether a flag F_THIDLMG is set to "1". The flag F_THIDLMG stores the state of the accelerator pedal. So, the flag F_THIDLMG is set to "1" when the accelerator (or throttle) is full open (or when the driver depresses the accelerator pedal). It is set to "0" when the accelerator is fully closed (or when the driver is stepping on the accelerator pedal). If the decision result of the step SA28 is "YES", indicating that the driver is depressing the accelerator pedal, the flow proceeds to step SA52 in order to prohibit idle stop of the engine. That is, the flag F_FCBRK indicating an OFF event of the brake while the deceleration F/C is continued is set to "0". Then, the flow reverts control to the main routine.

If the decision result of the step SA28 is "NO", the flow proceeds to step SA30.

In step SA30, a decision is made as to whether a flag F_HTRMG is set to "1". The flag F_HTRMG stores an idle stop inhibition signal output from the air conditioner. The flag F_HTRMG is then set to "1" when idle stop of the engine is inhibited, while it is set to "0" when idle stop of the engine is allowed. If the decision result of the step SA30 is "YES", the flow proceeds to step SA32.

In step SA32, a decision is made as to whether the variable VP representing running speed of the vehicle is equal to or above a variable #VIDLST or not. As described before, the variable VP designates the number of pulses which are produced in response to the running speed of the vehicle. Therefore, the step SA32 is used to determine whether the running speed of the vehicle is equal to or above a prescribed speed or not. If the decision result of the step SA32 is "YES", the flow proceeds to step SA52, then, the flow reverts control to the main routine. If it is "NO", the flow proceeds to step SA34 in which a flag F_IDLREST is set to "1". The flag F_IDLREST is used to inhibit idle stop of the engine when the vehicle is stopped. Due to the steps SA32 and SA34, idle stop of the engine is inhibited by the air conditioner until the vehicle starts running. After completion of the step SA34, the flow proceeds to step SA52, then, the flow reverts control to the main routine.

If the decision result of the step SA30 is "NO", the flow proceeds to step SA36 in which a decision is made as to whether a flag F_FCMGBAT is set to "1". Herein, the flag F_FCMGBAT is set to "1" when remaining battery charge of the battery 26 is in the zone $Z_1$ shown in FIG. 4A, while it is set to "0" when the remaining battery charge does not belong to the zone $Z_1$. Incidentally, the flag F_FCMGBAT is set by the battery ECU 32. If the decision result of the step SA36 is "NO", the flow proceeds to step SA52, then, the flow reverts control to the main routine. If it is "YES", the flow proceeds to step SA38.

In step SA38, a decision is made as to whether a flag F_OKNSW is set to "1". In step SA39, a decision is made as to whether a flag F_OKCLSW is set to "1". In step SA40, a decision is made as to whether a flag F_OKBRKSW is set to "1" or not. Herein, the flag F_OKNSW indicates ON/OFF of neutral gear, the flag F_OKCLSW indicates ON/OFF of the clutch pedal, and the flag F_OKBRKSW indicates ON/OFF of the brake pedal. These flags are set in consideration of the engine speed, running speed of the vehicle, and the position of the gear shift. If any one of the decision results of the steps SA38, SA39 and SA40 is "NO", the flow proceeds to step SA52, then, the flow reverts control to the main routine. Only when all of the decision results of the steps SA38 to SA40 are "YES", does the flow proceed to step SA42.

In step SA42, a decision is made as to whether a flag F_VPFCMG is set to "1". The flag F_VPFCMG is set to "1" when an error occurs in the pulses generated by the pulse generator which is installed in the wheel 14.

Assume that the pulse generator normally generates one hundred pulses per second. In this case, if the pulse generator stops generating pulses at a certain moment of time, the apparatus determines that an error has occurred on the pulse generator, so the flag F_VPFCMG is set to "1". If the decision result of the step SA42 is "YES", the flow proceeds to step SA52, then, the flow reverts control to the main routine. If it is "NO", the flow proceeds to step SA44 shown in FIG. 8.

In step SA44, a decision is made as to whether the variable VP storing the running speed of the vehicle is equal to or above the variable #VIDLST storing the prescribed speed (e.g., 3 km/h) or not. The flow branches two ways in response to the decision result of the step SA44. If the decision result of the step SA44 is "YES", the flow proceeds to a sequence of steps starting from step SA46 to determine whether to perform deceleration F/C. If "NO", the flow proceeds to another sequence of steps starting from step SA70 to determine whether to allow idle stop of the engine or not.

Concretely speaking, if the decision result of the step SA44 is "YES", in other words, if the running speed of the vehicle has reached the prescribed speed or above and the apparatus determines that the vehicle has started running, the flow proceeds to step SA46 to start the determination as to whether deceleration F/C is continued or not. That is, in step SA46, a flag F_FCMGV is set to "1", the flag F_IDLREST indicating inhibition of idle stop of the engine when the vehicle is stopped is set to "0", and a variable CNTL is set to "0". The flag F_FCMGV is set to "1" when the running speed of the vehicle is once increased high. In other words, this flag indicates an event in which the vehicle starts running at once. Since the step SA44 determines that the vehicle starts running, the flag F_FCMGV is set to "1" in the step SA46. The variable CNTL stores a value counting the restarts of the vehicle, wherein restart of the vehicle is detected in response to an in-gear state.

In step SA48, a decision is made as to whether the variable VP representing the running speed of the vehicle is equal to or above a variable #VFCMGST storing a prescribed speed (e.g., 30 km/h). If the decision result of the step SA48 is "YES", the flow proceeds to step SA50 in which the flag F_RVSREST indicating backward movement of the vehicle is set to "0". After completion of the step SA50, the flow proceeds to step SA52 in which the flag F_FCBRK indicating an OFF event of the brake while deceleration F/C is continued is set to "0". Then, the flow reverts control to the main routine.

If the decision result of the step SA48 is "NO", the flow proceeds to step SA54 in which a decision is made as to whether deceleration F/C is being continued. That is, the step SA54 makes a decision as to whether a flag F_VDEC is set to "1". This flag is set to "1" when deceleration is equal to or above a prescribed value (e.g., 0.05 G). If a decision result of the step SA54 is "NO", namely, if it is determined that the vehicle is not decelerating, the flow reverts control to the main routine. If it is "YES", the flow proceeds to step SA56.

In step SA56, a decision is made as to whether a flag F_NDLY is set to "1". The flag F_NDLY is set to "1" unless deviations of the running speed of the vehicle do not exceed a prescribed value, If a decision result of the step SA56 is "YES", the flow proceeds to step SA68 in which the flag F_FCMG is set to "1". Then, the flow reverts control to the main routine, so that idle stop of the engine is executed.

If the decision result of the step SA56 is "NO", the flow proceeds to steps SA58 to SA66 to make decisions as to whether flags F_NGRMG, F_CLNE, F_FCBRK, F_BKSW and F_CLON are respectively set to "1". Herein, the flag F_NGRMG is set to "1" when the driver selects a gear other than first gear. The flag F_CLNE is set to "1" if the engine speed is equal to or below a prescribed value (e.g., 1000 rpm) when the driver steps on the clutch pedal. The flag F_FCBRK indicates an OFF event of the brake while deceleration F/C is continued. The flag F_BKSW indicates that the driver is depressing the brake pedal. The flag F_CLON is set to "1" when the clutch is ON.

If the decision result of the step SA62 is "YES" or if any one of the decision results of the steps SA58, SA60, SA64 and SA66 is "NO", the flow reverts control to the main routine. If the decision result of the step SA62 is "NO" and all the decision results of the steps SA58, SA60, SA64 and SA66 are "YES", the flow proceeds to step SA68 in which the flag F_FCMG is set to "1". Then, the flow reverts control to the main routine, so that idle stop of the engine is executed.

If the decision result of the step SA44 is "NO", in other words, if the running speed of the vehicle does not reach the prescribed speed or more, the flow proceeds to step SA70 so as to start an idle stop determination process. In step SA70, a decision is made as to whether the variable CNTL is equal to or above a variable #CNTLFCMG or not. He rein, the variable CNTL stores a value counting the restarts of the vehicle, wherein restart of the vehicle is detected in response to an in-gear state. For example, the variable #CNTLFCMG is set to "2". If a decision result of the step SA70 is "YES", the flow reverts control to the main routine.

If the decision result of the step SA70 is "NO", the flow proceeds to step SA72. In step SA72, a decision is made as to whether the flag F_RVSREST is set to "1" or not. The flag F_RVSREST indicates a change of direction of movement of the vehicle in which the vehicle moving forward is changed to move backward. If the decision result of the step SA72 is "YES", the flow reverts control to the main routine. If it is "NO", the flow proceeds to step SA74 in which a decision is made as to whether the flag F_IDLREST is set to "1". The flag F_IDLREST designates prohibition of idle stop of the engine when the vehicle is stopped. If a decision result of the step SA74 is "YES", the flow reverts control to the main routine. If it is "NO", the flow proceeds to step SA76.

In step SA76, a decision is made as to whether the flag F_NDLY is set to "1". The flag F_NDLY is set to "1" if the driver continues to leave the gear in neutral for a certain time. If the decision result of the step SA76 is "YES", the flow proceeds to step SA68 in which the flag F_FCMG is set to "1". Then, the flow reverts control to the main routine, so that idle stop of the engine is executed.

If the decision result of the step SA76 is "NO", the apparatus executes a series of steps starting from step SA78, In step SA78, a decision is made as to whether the flag F_FCMGV indicating that the vehicle starts running at once is set to "1". In step SA80, a decision is made as to whether the flag F_NGRMG is set to "1". In step SA82, a decision is made as to whether the flag F_CLON indicating an ON event of the clutch is set to "1".

If any one of decision results of the steps SA78, SA80 and SA82 is "NO", the flow reverts control to the main routine. If all the decision results are "YES", the flow proceeds to step SA68 in which the flag F_FCMG indicating allowance of idle stop of the engine is set to "1". Then, the flow reverts control to the main routine, so that idle stop of the engine is executed.

By the aforementioned steps, the apparatus determines whether to execute the idle stop of the engine or not.

Next, a detailed description will be given with respect to a process for determining whether the engine 10 in an idle stop mode is restarted.

Figure 12:
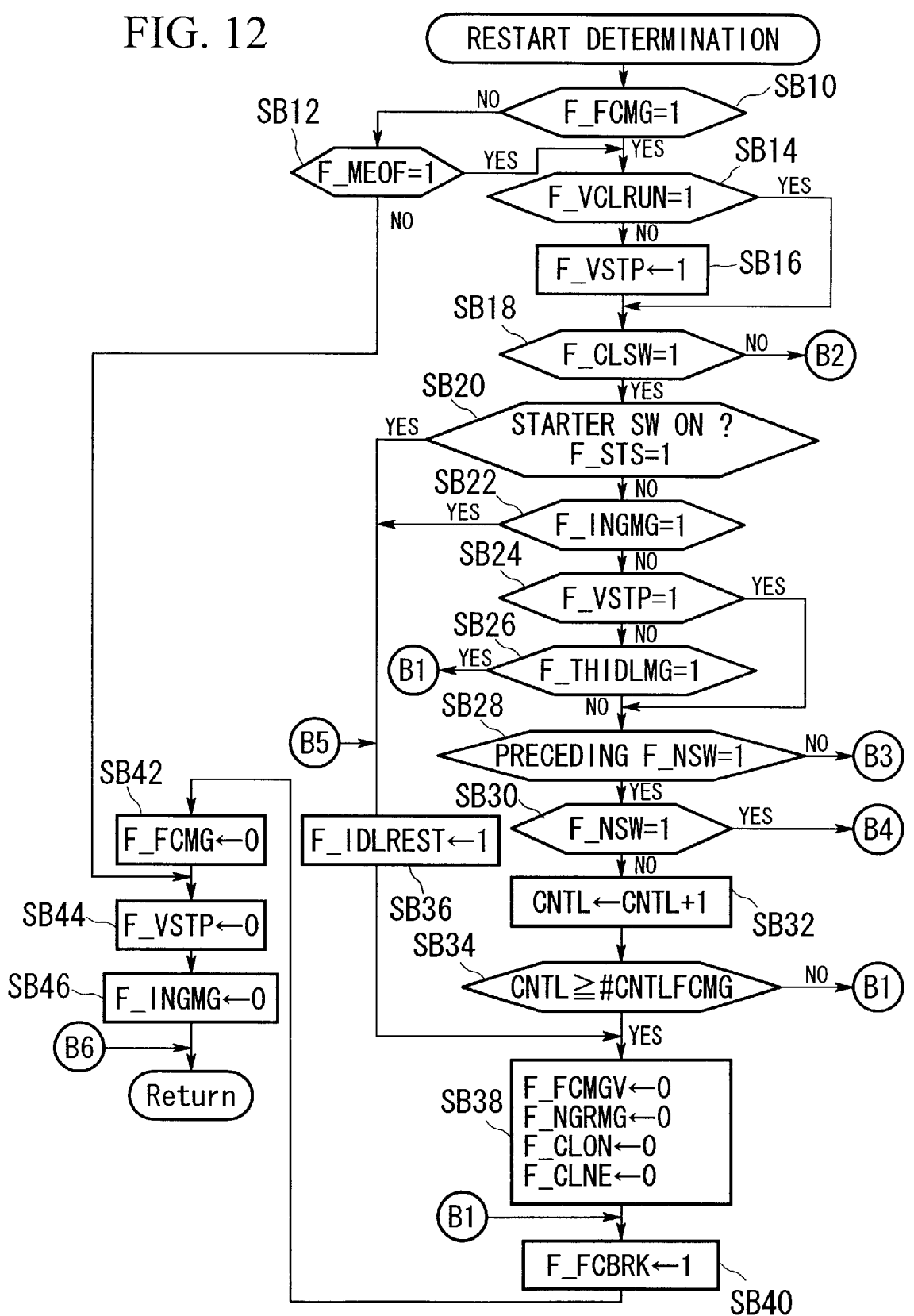
FIG. 12 is a flowchart showing the first part of an engine restart determination process in accordance with the first embodiment of the invention.
Figure 13:
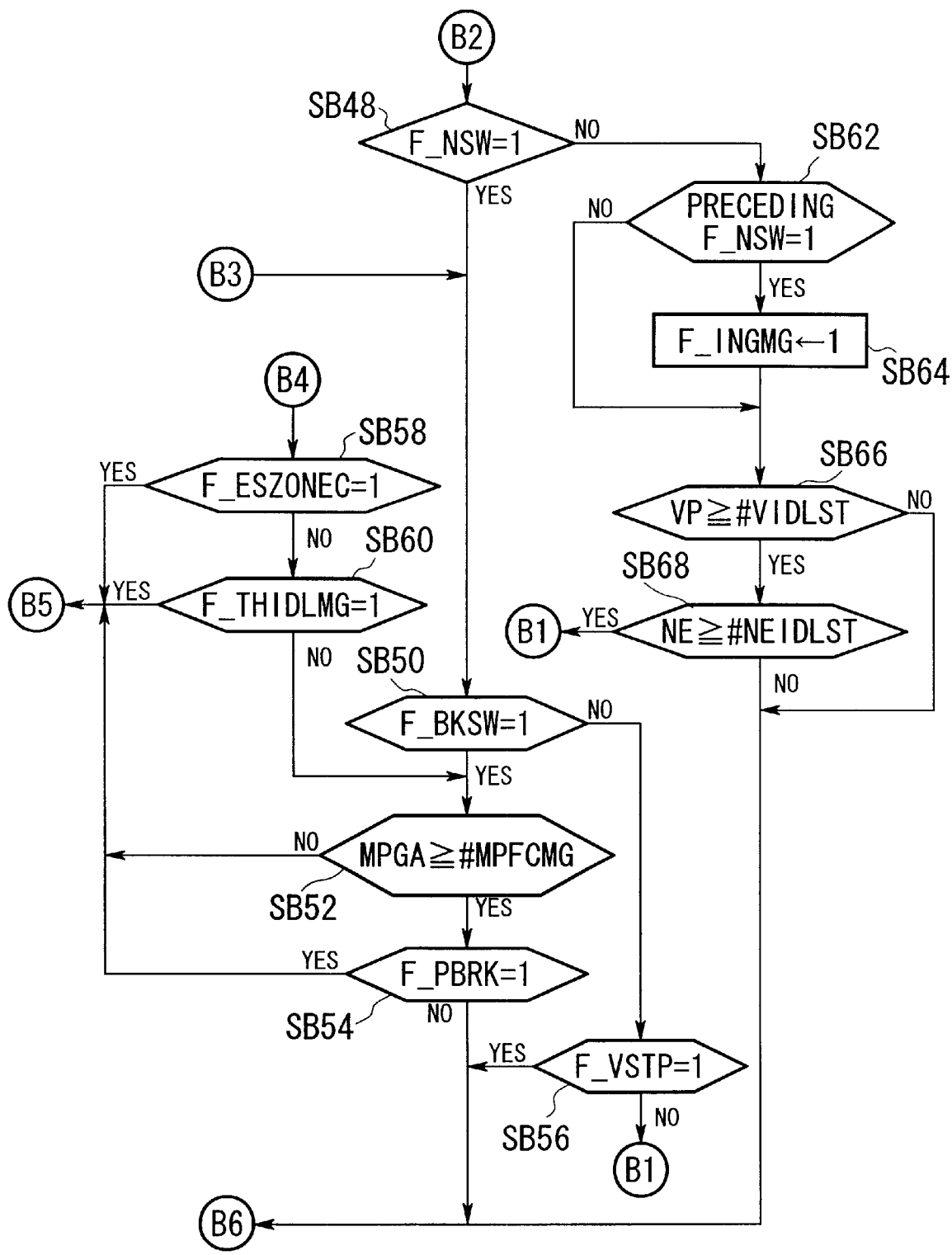
FIG. 13 is a flowchart showing the second part of the engine restart determination process in accordance with the first embodiment of the invention.

FIGS. 12 and 13 show an engine restart determination process, in which a determination is made as to whether the engine 10 is restarted, in accordance with the embodiment of the invention. The apparatus calls for the flow of FIGS. 12 and 13 to be executed at prescribed time intervals (e.g., 10 msec) from the main routine. Specifically, the engine ECU 18 (see FIG. 2) performs steps of the flow of FIGS. 12 and 13. Determination of whether to restart the engine is realized by setting the flag F_FCMG to "0" in FIGS. 12 and 13. In the aforementioned flow of FIGS. 7 and 8, the idle stop determination process is performed by setting the flag F_FCMG to "1". In the flow of FIGS. 12 and 13, the engine restart determination process is initiated by changing the flag F_FCMG from "1" to "0".

When the apparatus calls the flow of FIG. 12 to be executed from the main routine, the flow first proceeds to step SB10 in which a decision is made as to whether the flag F_FCMG is set to "1". This step is required for the process of FIGS. 12 and 13 to change the flag F_FCMG from "1" to "0". That is, this step is provided to prevent the apparatus from unnecessarily executing steps if the flag F_FCMG has been already set to "0" when the process is started. If a decision result of the step SB10 is "NO", the flow proceeds to step SB12.

In step SB12, a decision is made as to whether a flag F_MEOF is set to "1". The flag F_MEOF is set to "1" when the engine speed is zero. That is, this step is used to make engine stop determination. Concretely speaking, if the flag F_FCMG is set to "0", it is estimated that the engine is running because idle stop of the engine is prohibited. In that case, the decision result of the step SB12 is "NO", so that the flow proceeds to step SB44 in which a flag F_VSTP is set to "0". Then, in step SB46, a flag F_INGMG is set to "0". Thereafter, the flow reverts control to the main routine. Incidentally, the flags F_VSTP and F_INGMG will be described later.

The step SB12 determines that an engine stop occurs if the flag F_MEOF is set to "1" so that the engine speed is zero under inhibition of idle stop of the engine. In that case, the decision result of the step SB12 is "YES", so the apparatus performs the engine restart determination process. Specifically, the flow proceeds to step SB14. The aforementioned situation where the engine speed becomes zero under inhibition of idle stop of the engine is caused by a careless operation by the driver, who stops the vehicle in an in-gear state, for example. Hence, it is necessary to prepare to start the vehicle by automatic idle stop or restart of the engine.

In step SB14, a decision is made as to whether a flag F_VCLRUN is set to "1". The flag F_VCLRUN indicates whether the wheel 14 is rotating. That is, the flag F_VCLRUN is set to "1" when the wheel 14 rotates. If a decision result of the step SB14 is "YES", the flow proceeds to step SB18. If it is "NO", the flow proceeds to step SB16 in which the flag F_VSTP is set to "1". Herein, the flag F_VSTP indicates whether the vehicle is stopped. That is, it is set to "1" when the vehicle is stopped. With reference to the flag F_VSTP, it is possible to monitor whether the vehicle is stopped or not in the past, and it is possible to monitor a number of times the vehicle has stopped in the past.

In step SB18, a decision is made as to whether a flag F_CLSW is set to "1". The flag F_CLSW indicates whether the clutch is placed in the disengagement condition, in other words, whether the driver is depressing the clutch pedal. The flag F_CLSW is set to "1" if the clutch is disengaged. If the decision result of the step SB18 is "YES", the flow proceeds to step SB20 in which a decision is made as to whether the starter switch is ON. If the decision result of the step SB20 is "NO", the flow proceeds to step SB36 in which the flag F_IDLREST indicating inhibition of idle stop of the engine when the vehicle is stopped is set to "1". This step is provided to inhibit the idle stop of the engine from being executed until the flag F_IDLREST is reset to "0" when the vehicle starts running. After completion of the step SB36, the flow proceeds to step SB42 by way of steps SB38 and SB40. In step SB42, the flag F_FCMG is set to "0". After completion of the step SB42, the flow proceeds to steps SB44 and SB46 in series, then, the flow reverts control to the main routine. Thus, the apparatus controls the engine 10 to restart.

If the decision result of the step SB20 is "NO", the flow proceeds to step SB22 in which a decision is made as to whether a flag F_INGMG is set to "1". Herein, the flag F_INGMG indicates whether the driver performs an in-gear operation or not under an engagement condition of the clutch where the clutch is engaged (or the driver releases the clutch pedal) while the driver shifts the gear to neutral. When the driver performs the aforementioned operation, the flag F_INGMG is set to "1". If the decision result of the step SB22 is "YES", the flow proceeds to step SB36 in which the flag F_IDLREST indicating inhibition of idle stop of the engine when the vehicle is stopped is set to "1".

By the steps SB22 and SB36, the flag F_IDLREST indicating inhibition of the idle stop of the engine is set to "1" when the starter switch is not ON so that the driver establishes an in-gear state after shifting from the neutral gear without stepping on the clutch pedal, The basic design concept for the idle stop and restart of the engine is to start the engine when the driver makes a gear change while depressing the clutch pedal. To start the vehicle in a hurry, the driver does not always recognize which of depression of the clutch pedal and establishment of the in-gear state is made first. Actually, the driver selects the in-gear state before depressing the clutch pedal. If the driver recognizes that the in-gear state is established after depression of the clutch pedal, the engine does not start well. In that case, the driver considers that an engine problem has occurred. The steps SB22 and SB36 are provided to improve drivability and manual operation to handle the vehicle in order to respond to the aforementioned situation. That is, the present embodiment ensures that the engine is restarted when the driver depresses the clutch pedal again.

If the decision result of the step SB22 is "NO", the flow proceeds to step SB24 in which a decision is made as to whether the flag F_VSTP is set to "1". Herein, the flag F_VSTP indicates whether the vehicle is stopped.

If a decision result of the step SB24 is "NO", the flow proceeds to step SB26.

When the decision result of the step SB24 is "NO", it is assumed that the vehicle has no history of being stopped when the driver depresses the clutch pedal, in other words, the vehicle is running by inertia. In step SB26, a decision is made as to whether the flag F_THIDLMG representing the state of the accelerator pedal is set to "1". If the decision result of the step SB26 is "YES", in other words, if the driver depresses the accelerator pedal, the flow proceeds to step SB40 in which the flag F_FCBRK indicating an OFF event of the brake while deceleration F/C is continued is set to "1". In step SB42, the flag F_FCMG is set to "0". After completion of the step SB42, the flow proceeds to steps SB44 and SB46, then, the flow reverts control to the main routine, so that the apparatus controls the engine 10 to restart. In short, when the driver depresses the accelerator pedal when the vehicle is running by inertia, the engine is automatically restarted.

If the decision result of the step SB26 is "NO", in other words, if the vehicle has a history of being stopped or if the vehicle is running by inertia but the driver is not depressing the accelerator pedal, the flow proceeds to step SB28 in which a decision is made as to whether the flag F_NSW is previously set to "1" in a preceding cycle. The flag F_NSW indicates whether the driver shifts the gear to neutral or not. IF the gear is neutral, the flag F_NSW is set to "1". If the decision result of the step SB28 is "YES", the flow proceeds to step SB32 in which a decision is made as to whether the flag F_NSW is presently set to "1" in a present cycle or not. If so, the flow proceeds to step SB30. The flow sequentially proceeds to steps SB28, SB30 and SB32 when the driver depresses the clutch pedal to establish an in-gear state. That is, the apparatus performs basic controls for idle stop and restart of the engine, so that the engine is started when the driver depresses the clutch pedal to make a gear change.

In step SB32, the variable CNTL storing a value counting restarts of the vehicle is incremented. In step SB34, a decision is made as to whether the variable CNTL is equal to or above the variable #CNTLFCMG. For example, the variable #CNTLFCMG is set to "2".

If the decision result of the step SB34 is "YES", the flow proceeds to step SB38 in which all of flags F_FCMGV, FNGRMG, F_CLON and F_CLNE are set to "0". Herein, the flag F_FCMGV indicates that the vehicle starts running once, the flag F_NGRMG indicates that the driver is using a gear other than the first gear, the flag F_CLON indicates that the clutch is ON, and the flag F_CLNE indicates that the engine speed is equal to or below a prescribed value. After completion of the step SB38, or if the decision result of the step SB34 is "NO", the flow proceeds to step SB40.

In step SB40, the flag F_FCBRK indicating an OFF event of the brake during deceleration F/C being continued is set to "1".

After completion of the step SB40, the flow proceeds to step SB42 in which the flag F_FCMG indicating restart of the engine is set to "0". The flow then sequentially proceeds to steps SB44 and SB46, then, the flow reverts control to the main routine, so that the apparatus controls the engine to restart.

If both of the decision results of the steps SB28 and SB30 are "YES", in other words, if the driver has selected the neutral gear in both of preceding cycle and present cycle, the flow proceeds to step SB58 (see FIG. 13). In step SB58, a decision is made as to whether the flag F_ESZONEC is set to "1". If the decision result of the step SB58 is "YES", in other words, if remaining battery charge of the battery 26 is in the foregoing zone ZB or Zc shown in FIG. 4B so that idle stop of the engine is inhibited, the flow proceeds to step SB36 (see FIG. 12) in which the flag F_IDLREST indicating inhibition of the idle stop of the engine when the vehicle is stopped is set to "1". Then, the flow sequentially proceeds to steps SB38 and SB40, then, the flow proceeds to step SB42 in which the flag F_FCMG is set to "0". After completion of the step SB42, the flow proceeds to steps SB44 and SB46, then, the flow reverts control to the main routine, so that the apparatus controls the engine 10 to restart.

If the decision result of the step SB58 is "NO", the flow proceeds to step SB60 in which a decision is made as to whether the flag F_THIDLMG representing a state of the accelerator pedal is set to "1". If the decision result of the step SB60 is "YES", the flow proceeds to the aforementioned steps in which the flow proceeds when the decision result of the step SB58 is "YES".

If the decision result of the step SB60 is "NO", the flow proceeds to step SB52 in which a decision is made as to whether a variable MPGA is equal to or above a variable #MPFCMG. The variable MPGA stores a value representative of the master power negative pressure of the servo device. In addition, the variable #MPFCMG stores a value that initiates restart of the engine when a reduction occurs to the master power negative pressure. That is, the step SB52 is provided to secure "sufficient" negative pressure by restarting the engine to respond to an unwanted situation where the driver feels difficulty in operating the brake due to increasing reaction of the brake pedal when the master power negative pressure is lost, If the decision result of the step SB52 is "NO", the flow proceeds to the aforementioned steps in which the flow proceeds when the decision result of the step SB58 is If the decision result of the step SB52 is "NO", the flow proceeds to step SB54 in which a decision is made as to whether a variable F_PBRK is set to "1". Herein, the flag F_PBRK is set to "1" if ON/OFF operations of the brake pedal are made a prescribed number of times or more. Namely, this flag indicates whether the driver is pumping the brake. The step SB54 is provided to avoid reduction of the brake negative pressure, which is reduced if the driver frequently pumps the brake. If the decision result of the step SB54 is "YES", the flow proceeds to the aforementioned steps which the flow proceeds when the decision result of the step SB58 is "YES".

If the decision result of the step SB54 is "NO", the flow reverts control to the main routine.

Next, the engine restart determination process is started, so if the decision result of the step SB18 (see FIG. 12) is "NO" and the decision result of the step SB48 (see FIG. 13) is "YES", in other word, if the apparatus determines that the driver is not depressing the clutch pedal while in neutral gear, the flow proceeds to step SB50. In addition, the flow also proceeds to step SB50 if the decision result of the step SB28 (see FIG. 12) is In step SB50, a decision is made as to whether a flag F_BKSW indicating that the driver presently depresses the brake pedal is set to "1". If the decision result of the step SB50 is "YES", the flow proceeds to step SB52, the content of which was described before. If the decision result of the step SB50 is "NO", in other words, if the driver is not depressing the brake pedal, the flow proceeds to step SB56 in which a decision is made as to whether the flag F_VSTP indicating whether the vehicle is stopped is set to "1". If the decision result of the step SB56 is "YES", the flow reverts control to the main routine. If "NO", the flow proceeds to step SB40 (see FIG. 12), from which the flow proceeds to step SB42 in which the flag F_FCMG is set to "0". Then, the flow proceeds to steps SB44 and SB46, then, the flow reverts control to the main routine, so that the apparatus controls the engine 10 to restart.

When the decision result of the step SB56 is "NO", the driver is not depressing the clutch pedal nor the brake pedal while in the neutral gear, and the vehicle has no history of being stopped. This situation can be interpreted to mean that the driver truly intends to run the vehicle by inertia. It is unclear whether the driver intends to stop the vehicle (in other words, the driver may not intend to stop the vehicle) while the driver is running the vehicle by inertia. In this case, the apparatus provides a flow of control from step SB56 to step SB40 in order to restart the engine for preparing the next operation (e.g., acceleration operation).

If the engine restart determination process is started so that the decision result of the step SB18 turns to "NO", in other words, if the driver does not depress the clutch pedal, the flow proceeds to step SB48 in which a decision is made as to whether the flag F_NSW indicating whether the driver puts gear to neutral is set to "1". If the decision result of the step SB48 is "NO" because the apparatus determines that an in-gear state has been established, the flow proceeds to step SB62 in which a decision is made as to whether the flag F_NSW was previously set to "1" in a preceding cycle. That is, the apparatus determines whether the driver had the gear to neutral in the preceding cycle of processing. If the decision result of the step SB62 is "YES", the flow proceeds to step SB64 in which the flag F_INGMG is set to "1". Herein, the flag F_INGMG indicates whether the driver performs an in-gear operation under an engagement state of the clutch after the driver puts gear to neutral. After completion of the step SB64, the flow proceeds to step SB66. In addition, the flow also proceeds to step SB66 if the decision result of the step SB62 is "NO" so that the step SB64 is skipped.

In step SB66, a decision is made as to whether the variable VP representing running speed of the vehicle is equal to or above the variable #VIDLST storing the prescribed speed (e.g., 3 km/h). If the decision result of the step SB66 is "NO", the flow reverts control to the main routine. Thus, the apparatus controls the engine not to restart because the running speed of the vehicle has not reached the prescribed speed designated by the variable #VIDLST. If the decision result of the step SB66 is "YES", the flow proceeds to step SB68 in which a decision is made as to whether the variable NE representing the engine speed is equal to or above a variable #NEIDLST (e.g., 250 rpm). If the decision result is "NO", the flow reverts control to the main routine.

If the decision result of the step SB68 is "YES", the flow proceeds to step SB40 (see FIG. 12) in which the flag F_FCBRK indicating an OFF event of the brake during deceleration F/C being continued is set to "1". In step SB42, the flag F_FCMG indicating restart of the engine is set to "0". Then, the flow proceeds to steps SB44 and SB46, then, the flow reverts control to the main routine, so that the apparatus controls the engine to restart.

When the decision result of the step SB68 is "YES", the driver is not depressing the clutch pedal in an in-gear state, and the running speed is high so that the engine speed is correspondingly high. In this case, the apparatus continues the deceleration F/C. However, if the deceleration F/C is continued for a long time, there may be established a push-start condition as if the vehicle were being pushed to start the engine. For example, such a push-start condition is established when the driver forces the clutch to engage under execution of idle stop of the engine while the vehicle is running in second gear by inertia. To avoid occurrence of the push-start condition, the apparatus controls the engine to restart.

As described above, the preferred embodiments are respectively described with respect to actualization of the engine automatic start stop control apparatus of this invention. Of course, this invention is not necessarily limited by the embodiments, hence, it is possible to freely modify the embodiments within the scope of the invention. The embodiments exclusively describe hybrid vehicles. Of course, the technical features of this invention are applicable to other types of vehicles (e.g., normal automobiles which run with internal-combustion engines without using electric motor assists). In the aforementioned process of FIG. 9, the outside air temperature is estimated from the engine intake air temperature after the vehicle runs for the prescribed time. It is possible to exclude this process if the vehicle is equipped with a temperature sensor that directly measures the outside air temperature.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. An engine automatic start stop control apparatus that controls an engine to be automatically stopped or started in response to driving conditions of a vehicle, comprising:
   a clutch detector for detecting depression of a clutch pedal;
   an accelerator detector for detecting depression of an accelerator pedal;
   an automatic stop detector for detecting an automatic stop of the engine;
   a stop history checker for checking a history of stopping of the vehicle when the automatic stop detector detects the stop of the vehicle; and
   an automatic start device for terminating the automatic stop of the engine and starting the engine when the automatic stop detector detects the automatic stop, when the clutch detector detects the depression of the clutch pedal, when the stop history checker finds no stop history, and when the accelerator detector detects depression of the accelerator pedal.

2. An engine automatic start stop control apparatus according to claim 1, wherein the automatic stop detector detects fuel supply cut when the vehicle decelerates, to detect the stop of the vehicle.

* * * * *